US009672289B1

(12) United States Patent
Frind et al.

(10) Patent No.: US 9,672,289 B1
(45) Date of Patent: Jun. 6, 2017

(54) APPARATUS, METHOD AND ARTICLE TO FACILITATE MATCHING OF CLIENTS IN A NETWORKED ENVIRONMENT

(71) Applicant: PLENTYOFFISH MEDIA INC., Vancouver (CA)

(72) Inventors: Markus Frind, Vancouver (CA); Steve Oldridge, Vancouver (CA); Jesse Lee Faltus, New Westminster (CA)

(73) Assignee: PLENTYOFFISH MEDIA ULC, Vancouver (CA)

( * ) Notice: Subject to any disclaimer, the term of this patent is extended or adjusted under 35 U.S.C. 154(b) by 363 days.

(21) Appl. No.: 14/339,328

(22) Filed: Jul. 23, 2014

Related U.S. Application Data

(60) Provisional application No. 61/857,617, filed on Jul. 23, 2013.

(51) Int. Cl.
| G06F 15/18 | (2006.01) |
| G06F 17/30 | (2006.01) |
| G06N 5/04 | (2006.01) |
| G06Q 50/00 | (2012.01) |

(52) U.S. Cl.
CPC .... *G06F 17/30867* (2013.01); *G06F 17/3053* (2013.01); *G06N 5/04* (2013.01); *G06Q 50/01* (2013.01)

(58) Field of Classification Search
None
See application file for complete search history.

(56) References Cited

U.S. PATENT DOCUMENTS

| 5,583,763 | A | 12/1996 | Atcheson et al. |
| 5,749,091 | A | 5/1998 | Ishida et al. |
| 5,963,951 | A | 10/1999 | Collins |
| 6,006,225 | A | 12/1999 | Bowman et al. |
| 6,018,738 | A | 1/2000 | Breese et al. |
| 6,038,295 | A | 3/2000 | Mattes |
| 6,041,311 | A | 3/2000 | Chislenko et al. |
| 6,049,777 | A | 4/2000 | Sheena et al. |
| 6,058,367 | A | 5/2000 | Sutcliffe et al. |
| 6,064,980 | A | 5/2000 | Jacobi et al. |
| 6,134,532 | A | 10/2000 | Lazarus et al. |
| 6,169,986 | B1 | 1/2001 | Bowman et al. |

(Continued)

OTHER PUBLICATIONS

Fiore et al. "Assessing Attractiveness in Online Dating Profiles", CHI Friends, Foe, and Family, 2998, pp. 797-806.*

(Continued)

*Primary Examiner* — Li-Wu Chang
(74) *Attorney, Agent, or Firm* — Seed IP Law Group LLP

(57) ABSTRACT

Information related to apparently successful matches between two entities is collected, and culled based on a later indication that the match failed. Matches between two entities may be generated based on comparative information with other entities who appear to share some characteristics or preferences. Matches may be based on actual actions, in contrast to expressed preferences. Actual actions may be taken into account in addition to expressed preferences. Generation of matches may take into account geographical and/or temporal proximity and/or likelihood of receiving a response, in addition to other attributes of an entity. Matching algorithms may be updated based on entity input. Potential matches may be presented to third party entities for evaluation.

22 Claims, 15 Drawing Sheets

(56) References Cited

U.S. PATENT DOCUMENTS

| | | | |
|---|---|---|---|
| 6,199,067 B1 | 3/2001 | Geller | |
| 6,266,649 B1 | 7/2001 | Linden et al. | |
| 6,356,879 B2 | 3/2002 | Aggarwal et al. | |
| 6,735,568 B1 | 5/2004 | Buckwalter et al. | |
| 6,772,150 B1 | 8/2004 | Whitman et al. | |
| 6,782,370 B1 | 8/2004 | Stack | |
| 6,783,065 B2 | 8/2004 | Spitz et al. | |
| 6,853,982 B2 | 2/2005 | Smith et al. | |
| 6,912,505 B2 | 6/2005 | Linden et al. | |
| 7,113,917 B2 | 9/2006 | Jacobi et al. | |
| 7,240,353 B2 | 7/2007 | Lau et al. | |
| 7,313,536 B2 | 12/2007 | Westphal | |
| 7,324,998 B2 | 1/2008 | Beres et al. | |
| 8,122,142 B1 | 2/2012 | Svendsen et al. | |
| 8,180,765 B2 | 5/2012 | Nicolov | |
| 8,566,938 B1 | 10/2013 | Prakash et al. | |
| 8,577,874 B2 | 11/2013 | Svendsen et al. | |
| 8,620,790 B2 | 12/2013 | Priebatsch | |
| 8,626,663 B2 | 1/2014 | Nightingale et al. | |
| 8,825,802 B2 | 9/2014 | Pearce | |
| 8,930,398 B1 | 1/2015 | Kishore et al. | |
| 9,024,611 B2 | 5/2015 | Lee et al. | |
| 9,069,945 B2 | 6/2015 | Singh | |
| 9,219,704 B2 | 12/2015 | Hamlin et al. | |
| 2002/0095303 A1 | 7/2002 | Asayama et al. | |
| 2002/0156632 A1 | 10/2002 | Haynes et al. | |
| 2003/0093405 A1 | 5/2003 | Mayer | |
| 2003/0234519 A1 | 12/2003 | Farmer | |
| 2004/0012638 A1 | 1/2004 | Donnelli et al. | |
| 2005/0027707 A1 | 2/2005 | Syed | |
| 2005/0108227 A1 | 5/2005 | Russell-Falla et al. | |
| 2005/0108344 A1 | 5/2005 | Tafoya | |
| 2005/0240608 A1 | 10/2005 | Jones et al. | |
| 2006/0018522 A1* | 1/2006 | Sunzeri | G06F 17/30247 382/118 |
| 2006/0059142 A1 | 3/2006 | Zvinyatskovsky et al. | |
| 2006/0256959 A1 | 11/2006 | Hymes | |
| 2007/0005587 A1 | 1/2007 | Johnson et al. | |
| 2007/0112792 A1 | 5/2007 | Majumder | |
| 2007/0206917 A1* | 9/2007 | Ono | G11B 27/005 386/220 |
| 2007/0265962 A1 | 11/2007 | Bowe, Jr. et al. | |
| 2008/0039121 A1 | 2/2008 | Muller | |
| 2008/0086534 A1 | 4/2008 | Bardak et al. | |
| 2008/0103971 A1 | 5/2008 | Lukose et al. | |
| 2009/0066722 A1 | 3/2009 | Kriger et al. | |
| 2009/0094048 A1 | 4/2009 | Wallace et al. | |
| 2009/0106043 A1 | 4/2009 | Buckwalter et al. | |
| 2009/0144329 A1 | 6/2009 | Marlow | |
| 2009/0164464 A1 | 6/2009 | Carrico et al. | |
| 2009/0216734 A1 | 8/2009 | Aghajanyan et al. | |
| 2009/0248599 A1 | 10/2009 | Hueter et al. | |
| 2009/0299645 A1 | 12/2009 | Colby et al. | |
| 2010/0002920 A1 | 1/2010 | Cosatto et al. | |
| 2010/0036806 A1 | 2/2010 | Lam et al. | |
| 2010/0114614 A1 | 5/2010 | Sharpe | |
| 2010/0169376 A1* | 7/2010 | Chu | G06F 17/30973 707/780 |
| 2010/0262611 A1 | 10/2010 | Frind | |
| 2010/0318544 A1 | 12/2010 | Nicolov | |
| 2011/0107260 A1 | 5/2011 | Park et al. | |
| 2011/0131085 A1 | 6/2011 | Wey | |
| 2011/0167059 A1 | 7/2011 | Fallah | |
| 2011/0178881 A1 | 7/2011 | Pulletikurty | |
| 2011/0219310 A1 | 9/2011 | Robson | |
| 2011/0270813 A1 | 11/2011 | Cok et al. | |
| 2011/0306028 A1 | 12/2011 | Galimore | |
| 2012/0059850 A1 | 3/2012 | Bent et al. | |
| 2012/0088524 A1 | 4/2012 | Moldavsky et al. | |
| 2012/0102410 A1* | 4/2012 | Gewecke | G06F 17/30029 715/738 |
| 2012/0110085 A1 | 5/2012 | Malik et al. | |
| 2012/0123828 A1 | 5/2012 | Pahls et al. | |
| 2012/0166285 A1 | 6/2012 | Shapiro et al. | |
| 2012/0190386 A1 | 7/2012 | Anderson | |
| 2012/0284341 A1 | 11/2012 | Masood et al. | |
| 2013/0138741 A1 | 5/2013 | Redstone et al. | |
| 2013/0262984 A1 | 10/2013 | Mehr et al. | |
| 2013/0282745 A1 | 10/2013 | Mishra et al. | |
| 2014/0052861 A1 | 2/2014 | Frind et al. | |
| 2014/0095598 A1 | 4/2014 | Schornack et al. | |
| 2014/0095603 A1 | 4/2014 | Bhardwaj et al. | |
| 2014/0122628 A1 | 5/2014 | Yao et al. | |
| 2014/0136933 A1 | 5/2014 | Berger et al. | |
| 2014/0156750 A1 | 6/2014 | De Cristofaro et al. | |
| 2014/0207637 A1 | 7/2014 | Groarke | |

OTHER PUBLICATIONS

Alsaleh et al., "Improving Matching Process in Social Network Using Implicit and Explicit User Information," *Web Technologies and Applications* 313-320, 2011.

Frind et al. "Systems and Methods for Training and Employing a Machine Learning System in Evaluating Entity Pairs," Office Action, dated Aug. 16, 2016, for U.S. Appl. No. 14/163,849, 60 pages.

Kuchka et al., "Apparatus, Method and Article to Identify Discrepancies Between Clients and in Response Prompt Clients in a Networked Environment," Amendment, filed Aug. 4, 2016, for U.S. Appl. No. 14/204,939, 38 pages.

Kuchka et al., "Apparatus, Method and Article to Identify Discrepancies Between Clients and in Response Prompt Clients in a Networked Environment," Office Action, dated Sep. 8, 2016, for U.S. Appl. No. 14/204,939, 104 pages.

"Binary search tree," Wikipedia, retrieved on Feb. 24, 2015, from http://en.wikipedia.org/wiki/Binary_search_tree, 11 pages.

"Chargeback," Wikipedia, retrieved on Feb. 24, 2015, from http://en.wikipedia.org/wiki/Chargeback, 4 pages.

"Merchant account," Wikipedia, retrieved on Feb. 24, 2015, from http://en.wikipedia.org/wiki/Merchant_account, 10 pages.

"Understanding Chargebacks: A Guide to Chargebacks for Online Merchants," DalPay, retrieved on Feb. 24, 2015, from https://www.dalpay.com/en/support/chargebacks.html, 6 pages.

Frind et al., "Systems and Methods for Training and Employing a Machine Learning System in Evaluating Entity Pairs," U.S. Appl. No. 14/163,849, filed Jan. 24, 2014, 75 pages.

Frind, "System and Method for Adaptive Matching of User Profiles Based on Viewing and Contact Activity for Social Relationship Services," Preliminary Amendment filed May 24, 2011, for U.S. Appl. No. 12/488,512, 22 pages.

Frind, "System and Method for Adaptive Matching of User Profiles Based on Viewing and Contact Activity for Social Relationship Services," Office Action mailed Aug. 16, 2011, for U.S. Appl. No. 12/488,215, 14 pages.

Frind, "System and Method for Adaptive Matching of User Profiles Based on Viewing and Contact Activity for Social Relationship Services," Amendment filed Nov. 16, 2011, for U.S. Appl. No. 12/488,512, 16 pages.

Frind, "System and Method for Adaptive Matching of User Profiles Based on Viewing and Contact Activity for Social Relationship Services," Office Action mailed Mar. 5, 2012, for U.S. Appl. No. 12/488,512, 19 pages.

Frind, "System and Method for Adaptive Matching of User Profiles Based on Viewing and Contact Activity for Social Relationship Services," Amendment filed May 24, 2012, for U.S. Appl. No. 12/488,512, 20 pages.

Frind, "System and Method for Adaptive Matching of User Profiles Based on Viewing and Contact Activity for Social Relationship Services," Office Action mailed May 19, 2014, for U.S. Appl. No. 12/488,512, 20 pages.

Frind, "System and Method for Adaptive Matching of User Profiles Based on Viewing and Contact Activity for Social Relationship Services," Amendment filed Aug. 12, 2014, for U.S. Appl. No. 12/488,512, 11 pages.

Frind, "System and Method for Adaptive Matching of User Profiles Based on Viewing and Contact Activity for Social Relationship Services," Office Action mailed Nov. 18, 2014, for U.S. Appl. No. 12/488,512, 17 pages.

(56) References Cited

OTHER PUBLICATIONS

Frind, "System and Method for Adaptive Matching of User Profiles Based on Viewing and Contact Activity for Social Relationship Services," Amendment filed Jan. 6, 2015, for U.S. Appl. No. 12/488,512, 12 pages.
Frind, "System and Method for Adaptive Matching of User Profiles Based on Viewing and Contact Activity for Social Relationship Services," Amendment filed Feb. 13, 2015, for U.S. Appl. No. 12/488,512, 12 pages.
Kuchka et al., "Apparatus, Method and Article to Identify Discrepancies Between Clients and in Response Prompt Clients in a Networked Environment," U.S. Appl. No. 14/204,939, filed Mar. 11, 2014, 92 pages.
Levi et al., "Apparatus, Method and Article to Effect User Interest-Based Matching in a Network Environment," U.S. Appl. No. 14/668,808, filed Mar. 25, 2015, 111 pages.
Levi et al., "Apparatus, Method and Article to Facilitate Automatic Detection and Removal of Fraudulent User Information in a Network Environment," U.S. Appl. No. 14/561,004, filed Dec. 4, 2014, 89 pages.
MacKinnon, "Apparatus, Method and Article to Facilitate Exchange of Messages in a Network Environment," U.S. Appl. No. 14/575,888, filed Dec. 18, 2014, 83 pages.
Oldridge et al., "Apparatus, Method and Article to Effect Electronic Message Reply Rate Matching in a Network Environment," U.S. Appl. No. 14/563,504, filed Dec. 8, 2014, 55 pages.
Oldridge et al., "Apparatus, Method and Article to Facilitate User Behavioral Based Dertermination of User Values in a Network Environment," U.S. Appl. No. 62/013,849, filed Jun. 18, 2014, 68 pages.
Oldridge et al., "Apparatus, Method and Article to Predict and Prevent Chargebacks in a Network Environment," U.S. Appl. No. 14/679,792, filed Apr. 6, 2015, 69 pages.
Oldridge et al., "Systems and Methods for Training and Employing a Machine Learning System in Providing Service Level Upgrade Offers," U.S. Appl. No. 14/672,749, filed Mar. 30, 2015, 95 pages.
Tekle et al., "Apparatus, Method and Article to Facilitate Automatic Detection and Removal of Fraudulent Advertising Accounts in a Network Environment," U.S. Appl. No. 14/638,225, filed Mar. 4, 2015, 79 pages.
Therneau et al., "An Introduction to Recursive Partitioning Using the RPART Routines," Mayo Clinic, Feb. 24, 2015, 62 pages.
Frind et al., "Apparatus, Method and Article to Facilitate Matching of Clients in a Networked Environment," U.S. Appl. No. 61/691,082, filed Aug. 20, 2012, 131 pages.
Frind, "System and Method for Adaptive Matching of User Profiles Based on Viewing and Contact Activity for Social Relationship Services," Office Action, mailed Jun. 24, 2015, for U.S. Appl. No. 12/488,512, 19 pages.
Frind et al., "Apparatus, Method and Article to Facilitate Matching of Clients in a Networked Environment," Office Action, mailed Sep. 21, 2015, for U.S. Appl. No. 13/971,483, 25 pages.
Frind, "System and Method for Adaptive Matching of User Profiles Based on Viewing and Contact Activity for Social Relationship Services," Amendment, filed Sep. 24, 2015, for U.S. Appl. No. 12/488,512, 14 pages.
Frind, "System and Method for Adaptive Matching of User Profiles Based on Viewing and Contact Activity for Social Relationship Services," Office Action, mailed Nov. 12, 2015, for U.S. Appl. No. 12/488,512, 21 pages.
Frind et al., "Apparatus, Method and Article to Facilitate Matching of Clients in a Networked Environment," Amendment, filed Dec. 8, 2015, for U.S. Appl. No. 13/971,483, 33 pages.
Frind et al., "Systems and Methods for Training and Employing a Machine Learning System in Evaluating Entity Pairs," U.S. Appl. No. 61/756,912, filed Jan. 25, 201, 75 pages.
Frind et al., "Systems and Methods for Training and Employing a Machine Learning System in Evaluating Entity Pairs," Office Action, mailed Jan. 29, 2016, for U.S. Appl. No. 14/163,849, 61 pages.
Frind, "System and Method for Adaptive Matching of User Profiles Based on Viewing and Contact Activity for Social Relationship Services," Amendment, filed Mar. 11, 2016, for U.S. Appl. No. 12/488,512, 15 pages.
Frind et al., "Apparatus, Method and Article to Facilitate Matching of Clients in a Networked Environment," Office Action, mailed Apr. 6, 2016, for U.S. Appl. No. 13/971,483, 26 pages.
Frind et al., "Systems and Methods for Training and Employing a Machine Learning System in Evaluating Entity Pairs," Amendment, filed May 27, 2016, for U.S. Appl. No. 14/163,849, 23 pages.
Kuchka et al., "Apparatus, Method and Article to Identify Discrepancies Between Clients and in Response Prompt Clients in a Networked Environment," U.S. Appl. No. 61/780,391, filed Mar. 13, 2013, 92 pages.
Kuchka et al., "Apparatus, Method and Article to Identify Discrepancies Between Clients and in Response Prompt Clients in a Networked Environment," Office Action, mailed Apr. 4, 2016, for U.S. Appl. No. 14/204,939, 80 pages.
Levi et al., "Apparatus, Method and Article to Facilitate Automatic Detection and Removal of Fraudulent User Information in a Network Environment," U.S. Appl. No. 61/911,908, filed Dec. 4, 2013, 88 pages.
Levi et al., "Apparatus, Method and Article to Effect User Interest-Based Matching in a Network Environment," U.S. Appl. No. 61/976,296, filed Apr. 7, 2014, 111 pages.
MacKinnon, "Apparatus, Method and Article to Facilitate Exchange of Messages in a Network Environment," U.S. Appl. No. 61/918,466, filed Dec. 19, 2013, 83 pages.
Oldridge et al., "Apparatus, Method and Article to Effect Electronic Message Reply Rate Matching in a Network Environment," U.S. Appl. No. 61/914,154, filed Dec. 10, 2013, 50 pages.
Oldridge et al., "Systems and Methods for Training and Employing a Machine Learning System in Providing Service Level Upgrade Offers," U.S. Appl. No. 61/974,129, 95, filed Apr. 2, 2014, 95 pages.
Oldridge et al., "Apparatus, Method and Article to Facilitate User Behavioral Based Determination of User Values in a Network Environment," U.S. Appl. No. 14/737,121, filed Jun. 11, 2015, 68 pages.
Tekle et al., "Apparatus, Method and Article to Facilitate Automatic Detection and Removal of Fraudulent Advertising Accounts in a Network Environment," U.S. Appl. No. 61/948,159, filed Mar. 5, 2014, 79 pages.
Notice of Allowance, mailed Aug. 24, 2016, for U.S. Appl. No. 12/488,512, Frind, "System and Method for Adaptive Matching of User Profiles Based on Viewing and Contact Activity for Social Relationship Services," 20 pages.
Frind et al., "Apparatus, Method and Article to Facilitate Matching of Clients in a Networked Environment," Response Under 37 CFR 1.116, filed Jul. 21, 2016, for U.S. Appl. No. 13/971,483, 21 pages.

* cited by examiner

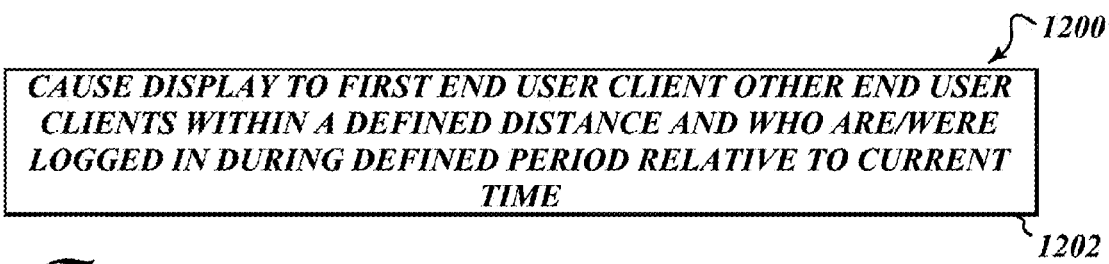
Fig. 12.
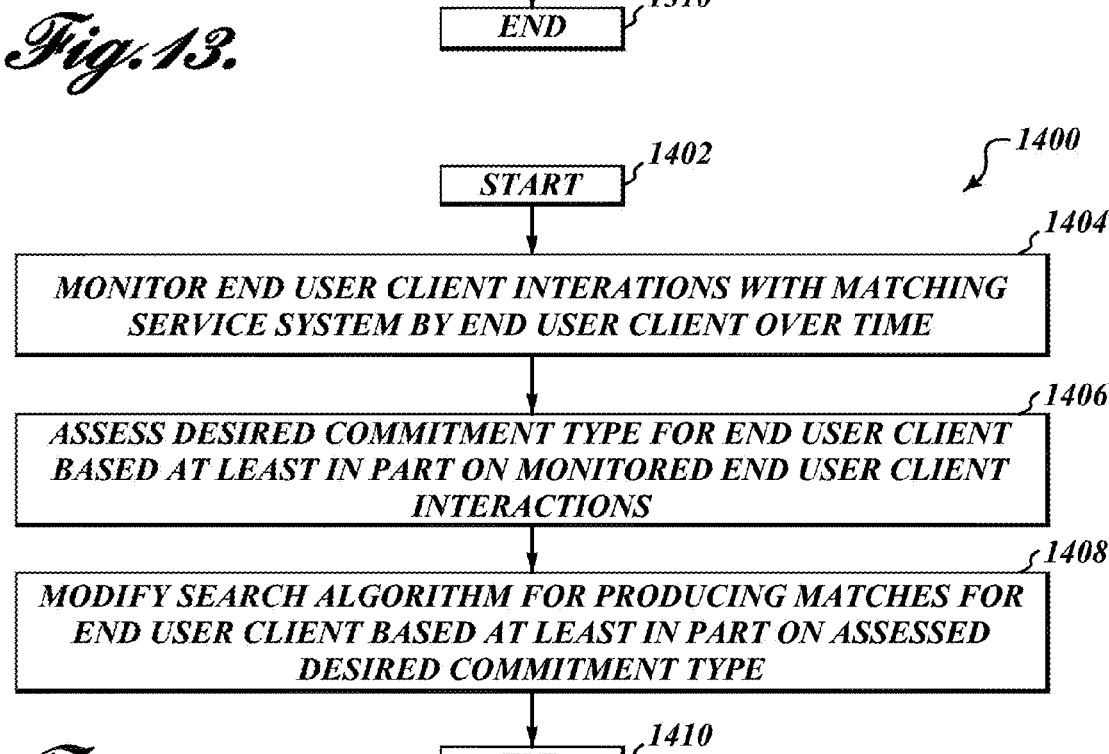
Fig. 13.
Fig. 14.

APPARATUS, METHOD AND ARTICLE TO FACILITATE MATCHING OF CLIENTS IN A NETWORKED ENVIRONMENT

BACKGROUND

Technical Field

The present disclosure generally relates to networked systems and methods, and in particular to systems and methods that facilitate matching of clients, for instance, end user clients of a matching service, based on an electronic collection and/or exchange of digital information and automated evaluation.

Description of the Related Art

There are various applications in which matching or proposing matches is central or at least useful. For example, there are numerous applications in which matching of clients, for instance, end user clients of a matching service, is a central focus of the matching service. A matching service may analyze certain information or data, and generate and propose matches between two different entities. The information or data may characterize one or more aspects, attributes or characteristics of one or both of the entities. This information characterizing the aspects, attributes or characteristics is typically self-reported. The information or data may be compared or otherwise analyzed with respect to a set of requirements or desires of one or both of the entities. These requirement(s) may, for example, be specified as constraints on the problem of finding prospective matches.

Matches may be generated or identified by satisfying one or more of the constraints. Satisfaction may include finding correspondence between specified aspects, attributes or characteristics of the entities. Satisfaction may include finding correspondence between specified aspects, attributes or characteristics of one of the entities and a set (i.e., one or more) of desired aspects, attributes or characteristics as requested or identified by the other one of the entities. Satisfaction may require exact correspondence between the aspect(s), attribute(s) or characteristic(s) of the entity and the constraint(s). In some instances, less than an exact match between the specified aspect(s), attribute(s) or characteristic(s) of one of the entities and a set (i.e., one or more) of desired aspect(s), attribute(s) or characteristic(s) as requested by the other one of the entities may be sufficient to achieve satisfaction. In some instances, correspondence between some of the specified aspects, attributes or characteristics of one of the entities and a plurality of desired aspects, attributes or characteristics as requested by the other one of the entities may be sufficient to achieve satisfaction. In other instances, correspondence between all of the specified aspects, attributes or characteristics of one of the entities and a plurality of desired aspects, attributes or characteristics as requested by the other one of the entities may be required to achieve satisfaction.

Entities may, for example, take the form of individuals who are attempting to find other individuals or businesses. For instance, an individual may be seeking a social relationship with another individual. Social relationships may, for example, include platonic friendships, romantic dating, activities (e.g., biking, hiking, sports teams), or seeking partners for short or long term social commitments (e.g., marriage, civil union). Alternatively, an individual may seek a business relationship with another individual or a business entity. Business relationships may include long term business relationships (e.g., professional relationships) or short term relationships (e.g., single job relationships). For instance, an individual may seek a health care provider (e.g., physician, dentist), some other professional (e.g., accountant, lawyer, plumber, electrician, or contractor) or some other business relationship (e.g., day laborer, house cleaner, sitter or childcare). Also, for instance, an employer may seek job applicants to fill one or more positions. An entity seeking a relationship may specify some necessary or desired criteria (e.g., constraints) which may be compared with respect to aspects, attributes or characteristics of possible candidates for a match.

To satisfy end user client entities, the matching services must find suitable matches quickly and accurately. Slow searching is an annoyance to end user client entities. Poor matches are a significant annoyance to both of the matched end user client entities, and are a real hindrance to further use of the matching system by the end user clients. Even where specified constraints are completely satisfied, an end user client may deem a proposed match to be unsuccessful for a variety of reasons. Further, in many instances the number of matches that satisfy the specified constraints may be overwhelming for an individual. Such presents a conundrum of whether to present all such matches and potentially alienate the individual, or to randomly select some subset of matches and possibly inadvertently exclude a highly desirable match.

BRIEF SUMMARY

Current approaches present a number of problems or drawbacks. For example, current approaches typically do not take into account real world data in assessing potential matches between entities. Many current approaches appear to rely on matching algorithms which are based on "common sense" or "intuition" and which are not based on actual observation and/or analysis. While some current approaches may to some extent rely on surveys in formulating their algorithms, for a variety of reasons such self-reported information is often misleading if not verified.

Also, it is particularly frustrating if end user client entities do not receive responses from potential matches. For instance, an end user client entity identified in a potential or proposed match may be particularly popular and overwhelmed with inquires (e.g., messages) from other end user clients, and hence may respond to only a few of the inquires or not at all. In other instances, an end user client entity identified in a potential or proposed match may be out of contact (e.g., offline or not logged in) or may only check for matches on an infrequent basis, so may be unlikely to respond to inquiries.

More flexible approaches to electronic or digital communications and automated matching systems which facilitate matches between clients, for instance, between end user clients of a matching service, are desirable.

Particularly desirable are approaches that accommodate the specific needs of various entities, while automating and managing certain aspects of quickly generating matches which are accurate and likely to receive follow up (e.g., replies, responses). Such may also advantageously take into account desired attributes or characteristics which are inferred from an entities' own actions, which may be different or even opposite to any desired attributes or characteristics explicitly specified by the entity.

A method of operation in a matching service system of a matching service, the matching service system having at least one processor, at least one nontransitory processor-readable medium communicatively coupled to the at least one processor, and a number of communications ports communicatively coupled to the at least one processor which provide communications with a plurality of end user devices, the end user devices logically associatable with a plurality of end user client accounts of the matching services, the end user client accounts logically associable with end user clients of the matching service, may be summarized as including, for each of a first plurality of paired end user clients of the matching service, populating a paired database with information for each of the end user clients of the respective paired end user clients; monitoring communications with the end user devices for a reappearance of any of the end user clients of any of the paired end user clients; and for the end user clients that reappear, culling the respective information for at least end user client that reappears from the paired database for end user.

Culling the respective information for at least the end user client that reappears from the paired database may include culling the respective information of both end user clients of the respective paired end user clients which respective paired end user clients may include the end user client that reappears. Monitoring communications with the end user devices for a reappearance of any of the end user clients of any of the paired end user clients may include monitoring for a reappearance of any of: a combination of a given name and a surname provided by the end user client or a screen name employed by the end user client. Monitoring communications with the end user devices for a reappearance of any of the end user clients of any of the paired end user clients may include monitoring for a reappearance of any of: an electronic mail address employed by the end user client, a piece of information stored in a cookie on a respective end user device logically associated with the end user client, or a browser profile for a browser.

The method of operation in a matching service system of a matching service may further include verifying at least one piece of information provided by at least one of the end user clients of the paired end user clients, wherein the first plurality of paired end user clients may be a subset of a larger number of paired end user clients, the first plurality of paired end user clients may include the end user clients for which the at least one piece of information has been verified.

For each of the paired end user clients the verifying may occur before populating the paired database with the respective information for the end user clients of the paired end user clients.

The method of operation in a matching service system of a matching service may further include electronically presenting at least some of the end user clients of at least some of the paired end user clients with a survey; and electronically receiving responses to the survey from at least some of the end user clients of at least some of the paired end user clients, wherein the verifying may be performed on a number of pieces of information contained in at least some of the received responses.

Verifying at least one piece of information provided by at least one of the end user clients of the paired end user clients may include verifying the at least one piece of information against an independent third party source of information. Verifying at least one piece of information provided by at least one of the end user clients of the paired end user clients may include verifying that the at least one piece of information provided by at least one of the end user clients is not a default choice provided to the end user client.

The method of operation in a matching service system of a matching service may further include correcting the at least one piece of information provided by at least one of the end user clients based at least in part on information from the independent third party source of information.

Verifying at least one piece of information provided by at least one of the end user clients of the paired end user clients may include verifying the at least one piece of information associated with a first user profile set up by the respective end user client with a second user profile set up by the respective end user client.

The method of operation in a matching service system of a matching service may further include determining an age provided by at least one of the end user clients of the paired end user clients, wherein the first plurality of paired end user clients may be a subset of a larger number of paired end user clients, the first plurality of paired end user clients may include the end user clients with an age within a defined age range.

For each of the paired end user clients the determining an age may occur before populating the paired database with the respective information for the end user clients of the paired end user clients, and wherein the age range may be logically associated with a defined type of commitment for which the paired database will be used to generate further paired end user clients. Populating a paired database with information for each of the end user clients of the respective paired end user clients may include populating the paired database with information collected during use of the matching service by the end user client and which may be indicative of non-profile related end user client interactions via the matching service. The non-profile related end user client interactions may include log in related interactions indicative of at least one of: a login frequency or an amount of login time. The non-profile related end user client interactions may include a number of messaging related actions. The messaging related actions may include at least one of: a length of messages sent by the respective end user client, a respective identity of other end user clients that the respective end user client messages, a respective identity of other end user clients that the respective end user client views and does not message, or an indication of a number of views of another end user client by the respective end user before the respective end user client messages the other end user client. The messaging related actions may include at least one of: a respective identity of other end user clients to whose messages the respective end user client does reply or a respective identity of other end user clients to whose messages the respective end user client does not reply. The messaging related actions may include an indication of a frequency of messaging by the respective end user client. The non-profile related end user client interactions may include a number of browsing actions. The non-profile related end user client interactions may include an indication of an operating system executed by at least one end user device logically associable with the end user client. The non-profile related end user client interactions may include a selection of another end user client by the respective end user client in response to a presentation to the respective end user client of an image of the other end user client without profile information. Populating a paired database with information for each of the end user clients of the respective paired end user clients may further include populating the paired database with profile information for the respective end user client.

A matching service system of a matching service may be summarized as including a number of communications ports which provide communications with a plurality of end user devices, the end user devices logically associatable with a plurality of end user client accounts of the matching services, the end user client accounts logically associable with end user clients of the matching service; at least one nontransitory processor-readable medium that stores at least one of processor executable instructions or data; and at least one processor communicatively coupled to the communications ports and at least one nontransitory processor-readable medium, and that: for each of a first plurality of paired end user clients of the matching service, populates a paired database with information for each of the end user clients of the respective paired end user clients; monitors communications with the end user devices for a reappearance of any of the end user clients of any of the paired end user clients; and for the end user clients that reappear, culls the respective information for at least end user client that reappears from the paired database for end user.

The at least one processor may cull the respective information of both end user clients of the respective paired end user clients which respective paired end user clients may include the end user client that reappears. The at least one processor may monitor communications for a reappearance of any of: a combination of a given name and a surname provided by the end user client or a screen name employed by the end user client. The at least one processor may monitor communications for a reappearance of any of: an electronic mail address employed by the end user client, a piece of information stored in a cookie on a respective end user device logically associated with the end user client, or a browser profile for a browser.

The at least one processor may further verify at least one piece of information provided by at least one of the end user clients of the paired end user clients, wherein the first plurality of paired end user clients may be a subset of a larger number of paired end user clients, the first plurality of paired end user clients may include the end user clients for which the at least one piece of information has been verified. The at least one processor may further cause an electronic presentation of a survey to at least some of the end user clients of at least some of the paired end user clients; and electronically receive responses to the survey from at least some of the end user clients of at least some of the paired end user clients, wherein the verification may be performed on a number of pieces of information contained in at least some of the received responses. The at least one processor may verify the at least one piece of information against an independent third party source of information. The default choice provided to the end user client may be the first day of any month. The at least one processor may further correct the at least one piece of information provided by at least one of the end user clients based at least in part on information from the independent third party source of information. The at least one processor may verify the at least one piece of information associated with a first user profile set up by the respective end user client with a second user profile set up by the respective end user client. The at least one processor may further determine an age provided by at least one of the end user clients of the paired end user clients, wherein the first plurality of paired end user clients may be a subset of a larger number of paired end user clients, the first plurality of paired end user clients may include the end user clients with an age within a defined age range. For each of the paired end user clients, the at least one processor may determine the respective age before populating the paired database with the respective information for the end user clients of the paired end user clients, and wherein the age range may be logically associated with a defined type of commitment for which the paired database will be used to generate further paired end user clients. The at least one processor may populate the paired database with information collected during use of the matching service by the end user client and which may be indicative of non-profile related end user client interactions via the matching service. The non-profile related end user client interactions may include log in related interactions indicative of at least one of: a login frequency or an amount of login time. The non-profile related end user client interactions may include a number of messaging related actions. The messaging related actions may include at least one of: a length of messages sent by the respective end user client, a respective identity of other end user clients that the respective end user client messages, a respective identity of other end user clients that the respective end user client views and does not message, or an indication of a number of views of another end user client by the respective end user before the respective end user client messages the other end user client. The messaging related actions may include at least one of: a respective identity of other end user clients to whose messages the respective end user client does reply or a respective identity of other end user clients to whose messages the respective end user client does not reply. The messaging related actions may include an indication of a frequency of messaging by the respective end user client. The non-profile related end user client interactions may include a number of browsing actions. The non-profile related end user client interactions may include an indication of an operating system executed by at least one end user device logically associable with the end user client. The non-profile related end user client interactions may include a selection of another end user client by the respective end user client in response to a presentation to the respective end user client of an image of the other end user client without profile information. The at least one processor may further populate the paired database with profile information for the respective end user client.

A method of operation in a matching service system of a matching service, the matching service system having at least one processor, at least one nontransitory processor-readable medium communicatively coupled to the at least one processor, and a number of communications ports communicatively coupled to the at least one processor which provide communications with a plurality of end user devices, the end user devices logically associatable with a plurality of end user client accounts of the matching services, the end user client accounts logically associable with end user clients of the matching service, may be summarized as including, for each respective one of a number of end user clients, identifying at least one recipient end user client who the respective end user client has messaged; identifying a number of comparative end user clients who have also messaged the at least one recipient end user client; identifying at least one other recipient end user client who at least one of the comparative end user clients has also messaged; and recommending the at least one other recipient end user client to the respective end user client.

Identifying a number of comparative end user clients who have also messaged the at least one recipient end user client may include performing a single value decomposition. Identifying at least one other recipient end user client who at least one of the comparative end user clients has also messaged may include identifying at least one other recipient end user client based at least in part on a total number of comparative end user clients who have messaged the same at least one other recipient end user client. Identifying at least one other recipient end user client who at least one of the comparative end user clients has also messaged may include identifying at least one other recipient end user client based at least in part on an evaluation of a likelihood that the at least one other recipient end user client will reply.

The method of operation in a matching service system of a matching service may further include determining how often the at least one other recipient end user client replies to messages, and wherein identifying at least one other recipient end user client who at least one of the comparative end user clients has also messaged may be based at least in part on the determination.

The method of operation in a matching service system of a matching service may further include evaluating at least one of: a length of messages sent by the respective end user client, a respective identity of other end user clients that the respective end user client messages, a respective identity of other end user clients that the respective end user client views and does not message, or an indication of a number of views of another end user client by the respective end user client before the respective end user client messages the other end user client, and wherein recommending the at least one other recipient end user client to the respective end user client may be based in part on the evaluation.

The method of operation in a matching service system of a matching service may further include evaluating at least one of: a length of messages sent by the at least one comparative end user client, a respective identity of other end user clients that the at least one comparative end user client messages, a respective identity of other end user clients that the at least one comparative end user client views and does not message, or an indication of a number of views of another end user client by the at least one comparative end user client before the respective end user client messages the other end user client; comparing the results of the evaluation for the at least one comparative end user client with the results of the evaluation for the respect end user client, and wherein recommending the at least one other recipient end user client to the respective end user client may be based in part on the comparison.

The method of operation in a matching service system of a matching service may further include determining at least one of: a respective identity of other end user clients to whose messages the respective end user client does reply or a respective identity of other end user clients to whose messages the respective end user client does not reply, and wherein recommending the at least one other recipient end user client to the respective end user client may be based in part on the determination.

The method of operation in a matching service system of a matching service may further include determining at least one of: a respective identity of other end user clients to whose messages the at least one comparative end user client does reply or a respective identity of other end user clients to whose messages the at least one comparative end user client does not reply; comparing the identities of the other end user clients to which the at least one comparative end user client either replies or does not reply with the identities of the other end user clients to which the respective end user client either replies or does not reply, and wherein recommending the at least one other recipient end user client to the respective end user client may be based in part on the comparison.

A matching service system of a matching service may be summarized as including a number of communications ports which provide communications with a plurality of end user devices, the end user devices logically associatable with a plurality of end user client accounts of the matching services, the end user client accounts logically associable with end user clients of the matching service; at least one non-transitory processor-readable medium that stores at least one of processor executable instructions or data; and at least one processor communicatively coupled to the communications ports and at least one nontransitory processor-readable medium, and that: for each respective one of a number of end user clients, identifies at least one recipient end user client who the respective end user client has messaged; identifies a number of comparative end user clients who have also messaged the at least one recipient end user client; identifies at least one other recipient end user client who at least one of the comparative end user clients has also messaged; and recommends the at least one other recipient end user client to the respective end user client.

The at least one processor may perform a single value decomposition to identify the number of comparative end user clients who have also messaged the at least one recipient end user client.

The at least one processor may identify at least one other recipient end user client based at least in part on a total number of comparative end user clients who have messaged the same at least one other recipient end user client. The at least one processor may identify at least one other recipient end user client based at least in part on an evaluation of a likelihood that the at least one other recipient end user client will reply. The at least one processor may further determine how often the at least one other recipient end user client replies to messages, and wherein identifying at least one other recipient end user client who at least one of the comparative end user clients has also messaged may be based at least in part on the determination. The at least one processor may further evaluate at least one of: a length of messages sent by the respective end user client, a respective identity of other end user clients that the respective end user client messages, a respective identity of other end user clients that the respective end user client views and does not message, or an indication of a number of views of another end user client by the respective end user before the respective end user client messages the other end user client, and wherein the at least one processor may base the recommendation of the at least one other recipient end user client to the respective end user client in part on the evaluation.

The at least one processor may further evaluate at least one of: a length of messages sent by the at least one comparative end user client, a respective identity of other end user clients that the at least one comparative end user client messages, a respective identity of other end user clients that the at least one comparative end user client views and does not message, or an indication of a number of views of another end user client by the at least one comparative end user client before the respective end user client messages the other end user client; compare the results of the evaluation for the at least one comparative end user client with the results of the evaluation for the respect end user client, and wherein recommending the at least one other recipient end user client to the respective end user client is based in part on the comparison. At least one processor may further determine at least one of: a respective identity of other end user clients to whose messages the respective end user client does reply or a respective identity of other end user clients to whose messages the respective end user client does not reply, and wherein the at least one processor may base the recommendation of the at least one other recipient end user client to the respective end user client at least in part on the determination. The at least one processor may further determine at least one of: a respective identity of other end user clients to whose messages the at least one comparative end user client does reply or a respective identity of other end user clients to whose messages the at least one comparative end user client does not reply; compare the identities of the other end user clients to which the at least one comparative end user client either replies or does not reply with the identities of the other end user clients to which the respective end user client either replies or does not reply, and wherein the at least one processor may base the recommendation of the at least one other recipient end user client to the respective end user client at least in part on the comparison.

A method of operation in a matching service system of a matching service, the matching service system having at least one processor, at least one nontransitory processor-readable medium communicatively coupled to the at least one processor, and a number of communications ports communicatively coupled to the at least one processor which provide communications with a plurality of end user devices, the end user devices logically associatable with a plurality of end user client accounts of the matching services, the end user client accounts logically associable with end user clients of the matching service may be summarized as including, for each of a number of end user clients logged on to the matching service, identifying a number of other end user clients who are concurrently logged on to the matching service; and recommending at least one of the number of other end user clients to the respective end user client.

The method of operation in a matching service system of a matching service may further include, for each of at least some of the number of other end user clients who are concurrently logged on to the matching service, comparing a respective set of end user profile characteristics to a set of desired characteristics specified for the respective end user client; and selecting the at least one of the number of other end user clients based at least in part on the comparison.

The method of operation in a matching service system of a matching service may further include, for each of a number of end user clients logged on to the matching service, identifying a location associated with the respective end user client; for each of at least some of the number of other end user clients who are concurrently logged on to the matching service, identifying a respective location associated with the other end user client; comparing the identified respective location associated with the at least one other end user client with the identified location associated with the respective end user client; and selecting the at least one of the number of other end user clients based at least in part on the comparison.

Comparing the identified respective location associated with the at least one other end user client with the identified location associated with the respective end user client may include determining whether the identified respective location associated with the at least one other end user client is within a defined distance of the identified location associated with the respective end user client.

A matching service system of a matching service may be summarized as including a number of communications ports which provide communications with a plurality of end user devices, the end user devices logically associatable with a plurality of end user client accounts of the matching services, the end user client accounts logically associable with end user clients of the matching service; at least one nontransitory processor-readable medium that stores at least one of processor executable instructions or data; and at least one processor communicatively coupled to the communications ports and at least one nontransitory processor-readable medium, and that: for each of a number of end user clients logged on to the matching service, identifies a number of other end user clients who are concurrently logged on to the matching service; and recommends at least one of the number of other end user clients to the respective end user client.

The at least one processor may further, for each of at least some of the number of other end user clients who are concurrently logged on to the matching service, compare a respective set of end user profile characteristics to a set of desired characteristics specified for the respective end user client; and select the at least one of the number of other end user clients based at least in part on the comparison. The at least one processor may further, for each of a number of end user clients logged on to the matching service, identify a location associated with the respective end user client; for each of at least some of the number of other end user clients who are concurrently logged on to the matching service, identify a respective location associated with the other end user client; compare the identified respective location associated with the at least one other end user client with the identified location associated with the respective end user client; and select the at least one of the number of other end user clients based at least in part on the comparison. The at least one processor may determine whether the identified respective location associated with the at least one other end user client is within a defined distance of the identified location associated with the respective end user client.

A method of operation in a matching service system of a matching service, the matching service system having at least one processor, at least one nontransitory processor-readable medium communicatively coupled to the at least one processor, and a number of communications ports communicatively coupled to the at least one processor which provide communications with a plurality of end user devices, the end user devices logically associatable with a plurality of end user client accounts of the matching services, the end user client accounts logically associable with end user clients of the matching service may be summarized as including, for each of a number of end user clients logged on to the matching service, identifying a location associated with the respective end user client; for each of at least some of the number of other end user clients who are concurrently logged on to the matching service, identifying a respective location associated with the other end user client; comparing the identified respective location associated with the at least one other end user client with the identified location associated with the respective end user client; selecting at least one of the number of other end user clients based at least in part on the comparison; and recommending the at least one of the number of other end user clients to the respective end user client.

Comparing the identified respective location associated with the at least one other end user client with the identified location associated with the respective end user client may include determining whether the identified respective location associated with the at least one other end user client is within a defined distance of the identified location associated with the respective end user client.

The method of operation in a matching service system of a matching service may further include, for the identified location associated with the respective end user client, determining the defined distance is based at least in part on population density proximate the identified location associated with the respective end user client.

The method of operation in a matching service system of a matching service may further include, for the identified location associated with the respective end user client, determining the defined distance is based at least in part on the number of other end user clients logged in during a defined period relative to a current time.

The method of operation in a matching service system of a matching service may further include, for the identified location associated with the respective end user client, determining the defined distance is based at least in part on the number of other end user clients logged in during a defined period relative to a current time.

The method of operation in a matching service system of a matching service may further include causing display to the respective end user client of the number of other end user clients within the defined distance and who were logged in during the defined period relative to a current time.

A matching service system of a matching service may be summarized as including a number of communications ports which provide communications with a plurality of end user devices, the end user devices logically associatable with a plurality of end user client accounts of the matching services, the end user client accounts logically associable with end user clients of the matching service; at least one nontransitory processor-readable medium that stores at least one of processor executable instructions or data; and at least one processor communicatively coupled to the communications ports and at least one nontransitory processor-readable medium, and that: for each of a number of end user clients logged on to the matching service, identifies a location associated with the respective end user client; for each of at least some of the number of other end user clients who are concurrently logged on to the matching service, identifies a respective location associated with the other end user client; compares the identified respective location associated with the at least one other end user client with the identified location associated with the respective end user client; selects at least one of the number of other end user clients based at least in part on the comparison; and recommends the at least one of the number of other end user clients to the respective end user client.

The at least one processor may determine whether the identified respective location associated with the at least one other end user client is within a defined distance of the identified location associated with the respective end user client. The at least one processor may further, for the identified location associated with the respective end user client, determine the defined distance is based at least in part on population density proximate the identified location associated with the respective end user client. The at least one processor may further, for the identified location associated with the respective end user client, determine the defined distance is based at least in part on the number of other end user clients logged in during a defined period relative to a current time. The at least one processor may further, for the identified location associated with the respective end user client, determine the defined distance is based at least in part on the number of other end user clients logged in during a defined period relative to a current time. The at least one processor may further cause a display to the respective end user client of the number of other end user clients within the defined distance and who were logged in during the defined period relative to a current time.

A method of operation in a matching service system of a matching service, the matching service system having at least one processor, at least one nontransitory processor-readable medium communicatively coupled to the at least one processor, and a number of communications ports communicatively coupled to the at least one processor which provide communications with a plurality of end user devices, the end user devices logically associatable with a plurality of end user client accounts of the matching services, the end user client accounts logically associable with end user clients of the matching service may be summarized as including providing recommendations to an end user client at a first time; receiving user input from the end user client in response to the provided recommendations; and adjusting a matching algorithm in response to the received user input.

Adjusting a matching algorithm in response to the received user input may include changing a weight associated with at least one parameter of the matching algorithm.

A matching service system of a matching service may be summarized as including a number of communications ports which provide communications with a plurality of end user devices, the end user devices logically associatable with a plurality of end user client accounts of the matching services, the end user client accounts logically associable with end user clients of the matching service; at least one nontransitory processor-readable medium that stores at least one of processor executable instructions or data; and at least one processor communicatively coupled to the communications ports and at least one nontransitory processor-readable medium, and that: provides recommendations to an end user client at a first time; receives user input from the end user in response to the provided recommendations; and adjusts a matching algorithm in response to the received user input.

The at least one processor may change a weight associated with at least one parameter of the matching algorithm to adjust the matching algorithm in response to the received user input.

A method of operation in a matching service system of a matching service, the matching service system having at least one processor, at least one nontransitory processor-readable medium communicatively coupled to the at least one processor, and a number of communications ports communicatively coupled to the at least one processor which provide communications with a plurality of end user devices, the end user devices logically associatable with a plurality of end user client accounts of the matching services, the end user client accounts logically associable with end user clients of the matching service may be summarized as including monitoring a plurality of end user client interactions with the matching service system by an end user client over time; assessing a desired commitment type for the end user client based at least in part on the monitored end user client interactions; and modifying a search algorithm for producing matches for the end user client based at least in part on the assessed desired commitment type for the end user client.

The assessed desired commitment type for the end user client may be different from a specified commitment type for the end user client that was specified by the end user client. Monitoring a plurality of end user client interactions with the matching service system by an end user client over time may include monitoring a desired commitment type for each of a plurality of other end user clients that are at least one of messaged or replied to by the end user client. Monitoring a plurality of end user client interactions with the matching service system by an end user client over time may include monitoring a desired commitment type for each of a plurality of other end user clients that are browsed by the end user client. Monitoring a plurality of end user client interactions with the matching service system by an end user client over time may include monitoring at least one of a length of message or a frequency of messaging by the end user client.

A matching service system of a matching service may be summarized as including a number of communications ports which provide communications with a plurality of end user devices, the end user devices logically associatable with a plurality of end user client accounts of the matching services, the end user client accounts logically associable with end user clients of the matching service; at least one nontransitory processor-readable medium that stores at least one of processor executable instructions or data; and at least one processor communicatively coupled to the communications ports and at least one nontransitory processor-readable medium, and that: monitors a plurality of end user client interactions with the matching service system by an end user client over time; assesses a desired commitment type for the end user client based at least in part on the monitored end user client interactions; and modifies a search algorithm for producing matches for the end user client based at least in part on the assessed desired commitment type for the end user client.

The assessed desired commitment type for the end user client may be different from a specified commitment type for the end user client that was specified by the end user client. The at least one processor may monitor a desired commitment type for each of a plurality of other end user clients that are at least one of messaged or replied to by the end user client. The at least one processor may monitor a desired commitment type for each of a plurality of other end user clients that are browsed by the end user client. The at least one processor may monitor at least one of a length of message or a frequency of messaging by the end user client.

A method of operation in a matching service system of a matching service, the matching service system having at least one processor, at least one nontransitory processor-readable medium communicatively coupled to the at least one processor, and a number of communications ports communicatively coupled to the at least one processor which provide communications with a plurality of end user devices, the end user devices logically associatable with a plurality of end user client accounts of the matching services, the end user client accounts logically associable with end user clients of the matching service may be summarized as including identifying a potential match between a first end user client and a second end user client; presenting to a number of other end user clients the potential match between the first end user client and the second end user client; receiving responses from at least some of the other end user clients indicative of whether the respective other end user client favors the potential match between the first end user client and the second end user client; and assessing the potential match between the first end user client and the second end user client based at least in part on the received responses.

The method of operation in a matching service system of a matching service may further include recommending the potential match between the first end user client and the second end user client to at least one of the first or the second end user clients based at least in part on the assessment.

The method of operation in a matching service system of a matching service may further include causing an indication of the received responses to be provided to at least one of the first or the second end user clients. The method of operation in a matching service system of a matching service may further include identifying an alternative potential match for at least one of the first end user client or the second end user client based at least in part on the assessment.

A matching service system of a matching service may be summarized as including a number of communications ports which provide communications with a plurality of end user devices, the end user devices logically associatable with a plurality of end user client accounts of the matching services, the end user client accounts logically associable with end user clients of the matching service; at least one nontransitory processor-readable medium that stores at least one of processor executable instructions or data; and at least one processor communicatively coupled to the communications ports and at least one nontransitory processor-readable medium, and that: identifies a potential match between a first end user client and a second end user client; presents to a number of other end user clients the potential match between the first end user client and the second end user client; receives responses from at least some of the other end user clients indicative of whether the respective other end user client favors the potential match between the first end user client and the second end user client; and assesses the potential match between the first end user client and the second end user client based at least in part on the received responses.

The at least one processor may further recommend the potential match between the first end user client and the second end user client to at least one of the first or the second end user clients based at least in part on the assessment. The at least one processor may further causes an indication of the received responses to be provided to at least one of the first or the second end user clients. The at least one processor may further identify an alternative potential match for at least one of the first end user client or the second end user client based at least in part on the assessment.

A method of operation in a matching service system of a matching service, the matching service system having at least one processor, at least one nontransitory processor-readable medium communicatively coupled to the at least one processor, and a number of communications ports communicatively coupled to the at least one processor which provide communications with a plurality of end user devices, the end user devices logically associatable with a plurality of end user client accounts of the matching services, the end user client accounts logically associable with end user clients of the matching service, may be summarized as including, for each of a number of respective end user clients, identifying a plurality of potential matches end user clients deemed likely to respond to messages; determining which of the plurality of potential matches end user clients to recommend to the respective end user client based at least in part on an assessed likelihood of response; and recommending at least some of the potential matches end user clients to the based at least in part on the determination.

Identifying a plurality of potential matches end user clients deemed likely to respond to messages may include identifying potential matches end user clients who have not received a message within a defined time of a current time as likely to respond to messages. Identifying a plurality of potential matches end user clients deemed likely to respond to messages may include identifying potential matches end user clients who have received less than a lower threshold number of messages within a defined time of a current time as likely to respond to messages. Identifying a plurality of potential matches end user clients deemed likely to respond to messages may include identifying potential matches end user clients who have logged on to the matching service at least one of frequently or for periods of time exceeding a minimum threshold as likely to respond to messages. Identifying a plurality of potential matches end user clients deemed likely to respond to messages may include identifying potential matches end user clients who employ a mobile end user device as likely to respond to messages.

Identifying a plurality of potential matches end user clients deemed likely to respond to messages may include identifying potential matches end user clients who have received an upper threshold number of messages within a defined time of a current time as unlikely to respond to messages. Identifying a plurality of potential matches end user clients deemed likely to respond to messages may include identifying potential matches end user clients who have logged on to the matching service at least one of infrequently or for periods of time below a minimum threshold as unlikely to respond to messages.

A matching service system may be summarized as including a number of communications ports which provide communications with a plurality of end user devices, the end user devices logically associatable with a plurality of end user client accounts of the matching services, the end user client accounts logically associable with end user clients of the matching service; at least one nontransitory processor-readable medium that stores at least one of processor executable instructions or data; and at least one processor communicatively coupled to the communications ports and at least one nontransitory processor-readable medium, and that: for each of a number of respective end user clients, identifies a plurality of potential matches end user clients deemed likely to respond to messages; determines which of the plurality of potential matches end user clients to recommend to the respective end user client based at least in part on an assessed likelihood of response; and recommends at least some of the potential matches end user clients to the based at least in part on the determination.

The at least one processor may identify potential matches end user clients who have not received a message within a defined time of a current time as likely to respond to messages. The at least one processor may identify potential matches end user clients who have received less than a lower threshold number of messages within a defined time of a current time as likely to respond to messages. The at least one processor may identify potential matches end user clients who have logged on to the matching service at least one of frequently or for periods of time exceeding a minimum threshold as likely to respond to messages. The at least one processor may identify potential matches end user clients who employ a mobile end user device as likely to respond to messages. The at least one processor may identify potential matches end user clients who have received an upper threshold number of messages within a defined time of a current time as unlikely to respond to messages. The at least one processor may identify potential matches end user clients who have logged on to the matching service at least one of infrequently or for periods of time below a minimum threshold as unlikely to respond to messages.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

FIG. 12 is a flow diagram showing a low level method of operation of a matching service system to display currently logged in matches to an end user client, according to one illustrated embodiment.

FIG. 13 is a flow diagram showing a low level method of operation of a matching service system to adjust a matching algorithm in response to end user client entity input, according to one illustrated embodiment.

FIG. 14 is a flow diagram showing a low level method of operation of a matching service system to adjust a matching algorithm in response to end user client entity input, according to one illustrated embodiment.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computer systems, server computers, and/or communications networks have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

Figure 1:
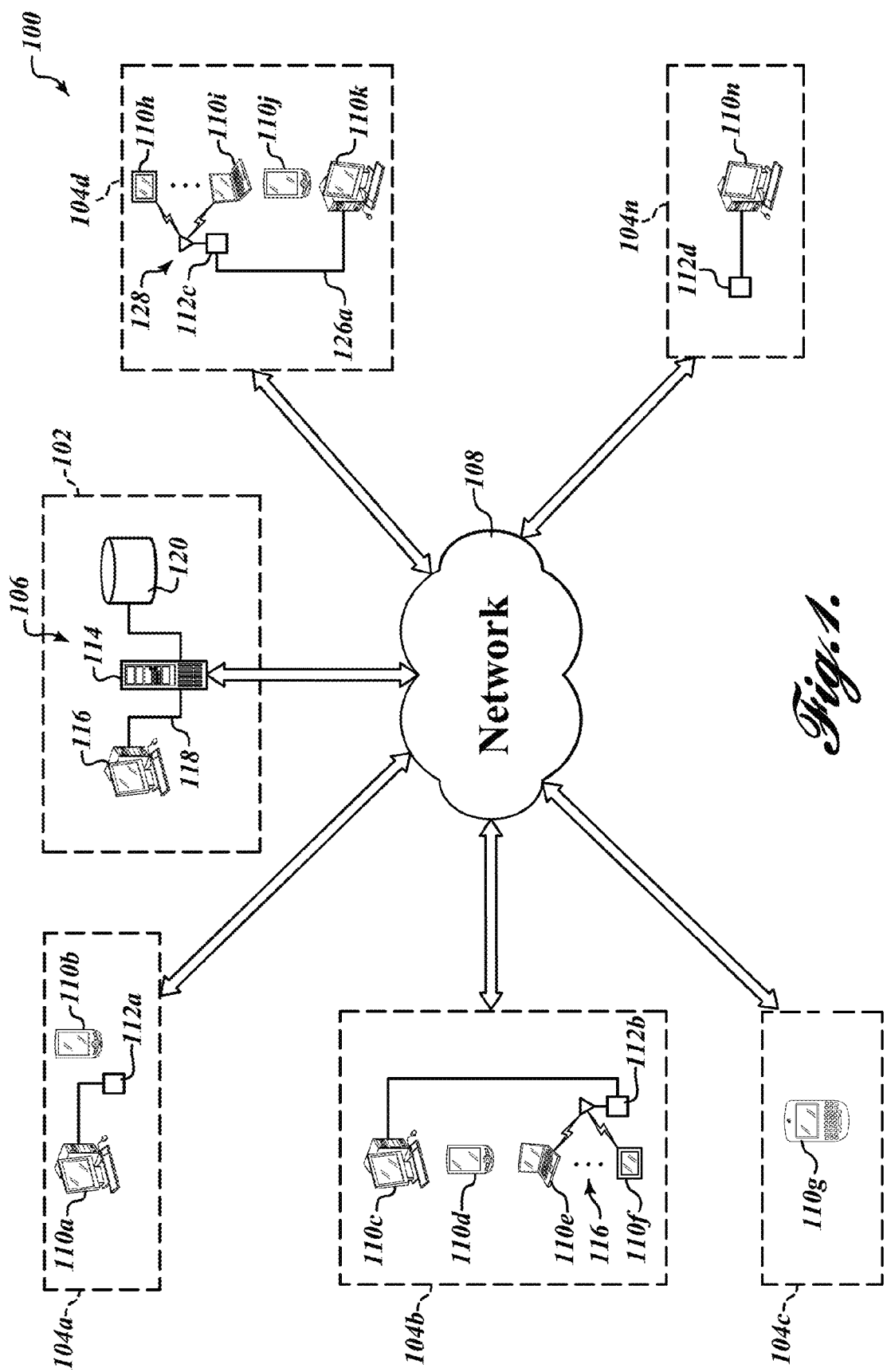
FIG. 1 is a schematic view of a networked matching service environment according to one illustrated embodiment, including a matching service system; a plurality of end user client entities of the matching service each with associated processor-based devices to provide communications with the matching service system.

FIG. 1 shows a networked environment 100 in which matching services are provided by a matching service entity 102 to a plurality of matching service end user client entities 104a-104n (only five shown, collectively 104), according to one illustrated embodiment.

The matching service entity 102 operates one or more matching service systems 106. The matching service system(s) 106 is communicatively coupled or communicatively coupleable via one or more networks 108 to one or more processor-based devices 110a-110n (eleven shown, collectively 110) associated with the end user client entities 104.

The matching service entity 102 may take any of a variety of forms. For example, the matching service entity 102 may take the form of an individual or business that provides matching services. The matching services may include providing matches or proposed matches between pairs of end user client entities 104 (i.e., matched paired of end user clients) for any number of types of relationships or reasons. For example, the matching service entity 102 may identify and propose matches between various pairs of end user client entities for social relationships or business relationships.

The end user client entities 104 may take any variety of forms, for example, being of any of a variety of sizes. In many instances, the end user client entities 104 will be individuals looking to establish relationships with other individuals. Alternatively, the end user client entities 104 will be individuals looking to establish relationships with businesses (e.g., sole proprietorship, small corporations, partnerships, limited partnerships, limited liability companies, small or large corporations, multi-national corporations, other companies or businesses). As a further alternative, the end user client entities 104 may be businesses looking to establish relationships with other businesses or with individuals.

Each end user client entity 104 may be logically or otherwise associated with one or more processor-based devices 110a-110n, at least when interacting with the matching service. The processor-based devices 110 may take any of a large variety of forms, including but not limited to personal computers (e.g., desktop computers 110a, 110c, 110k, or laptop computers 110e, net book computers 110i, tablet computers 110f, 110h, smart phones 110b, 110d, 110g, 110j, workstation computers 110n, and/or mainframe computers (not shown), and the like.

Notably, some end user client entities 104c, 104n may be logically associated with a single processor-based device 110g, 110n, respectively. In many instances, each respective end user client entity 104a, 104b, 104d may be logically associated with two or more processor-based devices. The logical association may be established via an account record or other data structure which may be set up when the end user client entity 104 registers with the matching service entity 102. For example, an account may be set up for the end user client entity 104, which specifies device address information (e.g., uniform resource locator or URL, phone number, SIM mobile subscriber identifier, mobile equipment identifier, MAC address) for one or more processor-based devices 110. The logical association may be established on an ad hoc basis, for example in response to an end user client entity 104 logging into a portal (e.g., Web portal) using one or more applications (e.g., browser) executed on or by one of the processor-based devices 110. Such may include the entering of a user name and a password by the end user client entity 104, and verification of the user name and password with an end user client entity account by the matching service systems 106. Such ad hoc logical associations may be temporary, and may move from processor-based device 110 to processor based device 110 as the particular end user client entity 104 moves.

The processor-based devices 110 are capable communications, for example via one or more networks 108 (e.g., Wide Area Networks, Local Area Networks), for instance packet switched communications networks, such as the Internet, Worldwide Web portion of the Internet, extranets, intranets, and/or various other types of telecommunications networks such as cellular phone and data networks, and plain old telephone system (POTS) networks. The type of communications infrastructure should not be considered limiting. One or more communications interface devices 112a-112d (four shown, collectively 112) may provide communications between the processor-based device 100 and the network(s) 108. The communications interface devices 112 may take any of a large variety of forms, including modems (e.g., DSL modem, cable modem), routers, network switches, and/or bridges, etc.

The matching service system 106 operates as an intermediary between the processor-based devices 110 of the end user client entities 104 to facilitate the identification of potential matches.

The matching service system 106 may have one or more matching service server computers 114 (only one illustrated) to provide electronic communications either externally from and/or internally within the matching service entity 102. To handle the load of multiple end user client entities 104, the matching service system 106 will typically have more than one matching service server computer system 114. The matching service system 106 may include one or more terminals or personal computers 116 (only one shown), communicatively coupled to the matching service server computer 114 via one or more wired or wireless networks 118 (only one shown). The terminals or personal computers 116 allow input and output by an end user (e.g., employee or contractor of the matching service entity 102).

The matching service system 106 includes at least one nontransitory computer- or processor-readable storage medium 120 (e.g., hard drive, RAID, RAM). The nontransitory computer- or processor-readable storage medium 120 stores a variety of information about the end user client entities 104, facilitating the automated analyzing, finding and reporting of matches between the end user client entities 104, and optionally the fostering of communications there between, for instance, including the transmission of electronic correspondence including electronic messages and electronic replies or responses thereto.

In most implementations, the aspects, attributes or characteristics of the end user client entities 104 will be stored by the matching service server computer 114 and/or computer- or processor-readable storage medium 120, for instance, in an "available end user clients" database or other data structure(s). The matching service server computer 114 may, from time-to-time, import or write end user aspects, attributes or characteristics to the available end user clients database stored on the computer- or processor-readable storage medium 120. The matching service server computer 114 may, from time-to-time, retrieve or extract the end user aspects, attributes or characteristics from the available end user clients database stored on the computer- or processor-readable storage medium 120. For example, the matching service server computer 114 may retrieve the aspects, attributes or characteristics of the end user client entities 104 in response to a query. For example, the matching service server computer 114 may retrieve the aspects, attributes or characteristics of the end user client entities 104 in response to a query by one end user client entity searching for a match with another end user client entity. While denominated as an "available end user clients" database, the term "available" does not necessarily mean that such database is only populated with information about those end user client entities still seeking a match. In fact, end user client entities who have already received proposed matches, and/or who may have already established a relationship based on such proposed matches may still be represented in the available end user clients database. Such may, for example, remain represented in the available end user clients database until they request removal and/or close their account with the matching service.

Advantageously, aspects, attributes or characteristics of successful matched or paired end user client entities 104 will be stored by the matching service server computer 114 and/or computer- or processor-readable storage medium 120, for instance, in a "successfully paired end user clients" database or other data structure(s). The matching service server computer 114 may, from time-to-time, import or write end user aspects, attributes or characteristics to the successfully paired end user clients database stored on the computer- or processor-readable storage medium 120. The matching service server computer 114 may, from time-to-time, retrieve or extract the end user aspects, attributes or characteristics from the successfully paired end user clients database stored on the computer- or processor-readable storage medium 120. For example, the matching service server computer 114 may retrieve the aspects, attributes or characteristics of the end user client entities 104 in response to a query. For example, the matching service server computer 114 may retrieve the aspects, attributes or characteristics of the end user client entities 104 in response to a query by the matching service entity 102 when analyzing aspects, attributes or characteristics that produce successful matches in assessing and/or refining a matching algorithm employed by the matching service entity 102 in generating the proposed matches.

While illustrated as a single nontransitory computer- or processor-readable storage medium 120, in many implementations the nontransitory computer- or processor-readable storage medium 120 may constitute a plurality of nontransitory storage media. The plurality of nontransitory storage media may be commonly located at a common location, or distributed at a variety of remote locations. Thus, the available end user clients database and/or the successfully matched database may be implemented in one, or across more than one, nontransitory computer- or processor-readable storage media. Such database(s) may be stored separately from one another on separate computer- or processor-readable storage medium 120 or may be stored on the same computer- or processor-readable storage medium 120 as one another. The computer- or processor-readable storage medium 120 may be co-located with the matching service server computer system 114, for example, in the same room, building or facility. Alternatively, the computer- or processor-readable storage medium 120 may be located remotely from the matching service server computer system 114, for example, in a different facility, city, state or country. Electronic or digital information, files or records or other collections of information may be stored at specific locations in non-transitory computer- or processor-readable media 120, thus are logically addressable portions of such media, which may or may not be contiguous.

While FIG. 1 illustrates a representative networked environment 100, typical networked environments may include many additional computer systems and entities. The concepts taught herein may be employed in a similar fashion with more populated networked environments than that illustrated.

Figure 2:
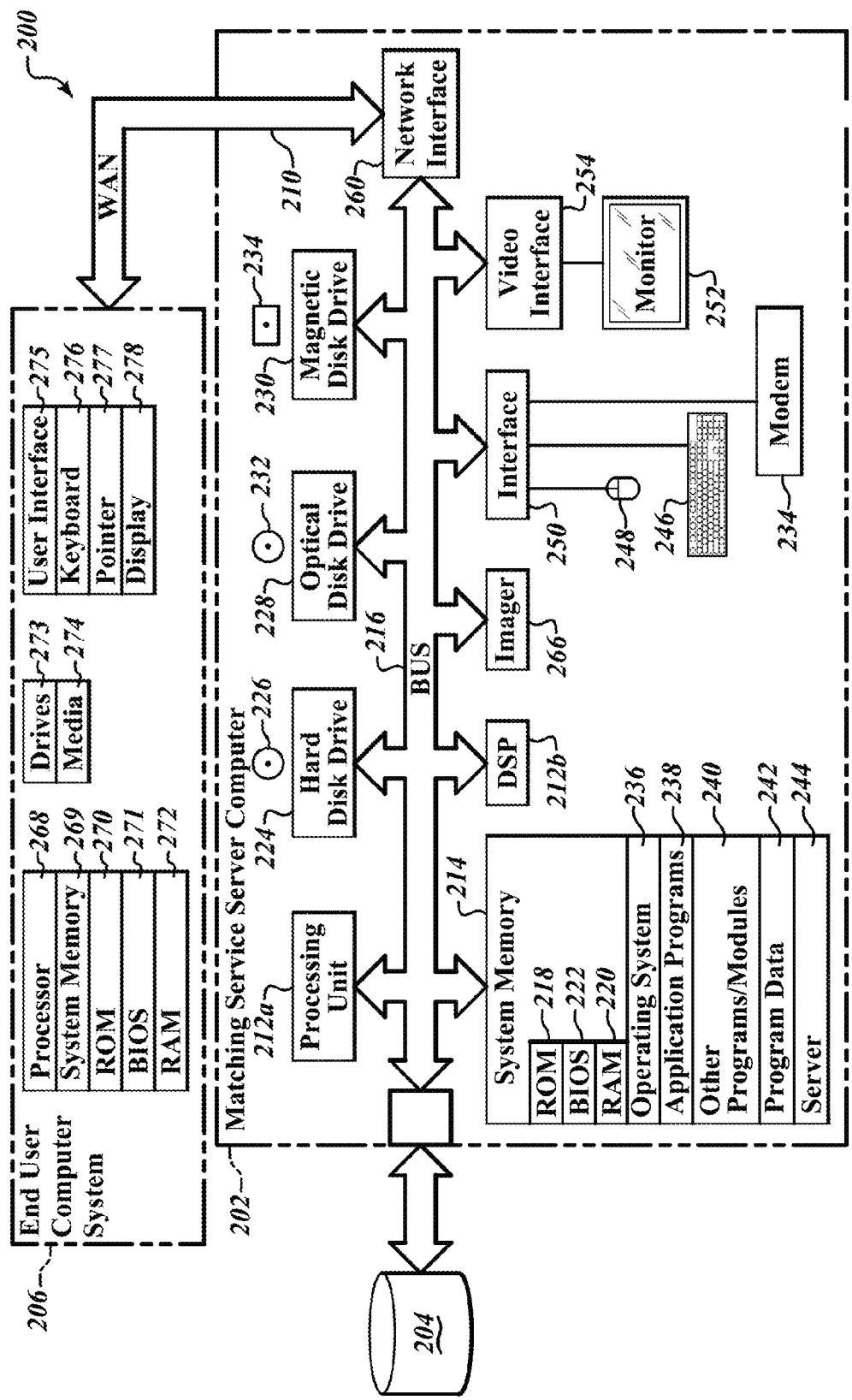
FIG. 2 is a functional block diagram of a matching service system networked to one of the end user client processor-based devices, according to one illustrated embodiment.

FIG. 2 and the following discussion provide a brief, general description of a suitable networked environment 200 in which the various illustrated embodiments can be implemented. Although not required, the embodiments will be described in the general context of computer-executable instructions, such as program application modules, objects, or macros stored on computer- or processor-readable media and executed by a computer or processor. Those skilled in the relevant art will appreciate that the illustrated embodiments, as well as other embodiments, can be practiced with other system configurations and/or other computing system configurations, including hand-held devices (e.g., smart phones, tablet devices, netbooks, personal digital assistants), multiprocessor systems, microprocessor-based or programmable consumer electronics, personal computers ("PCs"), networked PCs, mini computers, mainframe computers, and the like. The embodiments can be practiced in distributed computing environments where tasks or modules are performed by remote processing devices, which are linked through a communications network. In a distributed computing environment, program modules may be located in both local and remote memory storage devices or media.

FIG. 2 shows a networked environment 200 comprising one or more matching service server computer systems 202 (only one illustrated) and one or more associated nontransitory computer- or processor-readable storage medium 204 (only one illustrated). The associated nontransitory computer- or processor-readable storage medium 204 is communicatively coupled to the matching service server computer system(s) 202 via one or more communications channels, for example, one or more parallel cables, serial cables, or wireless channels capable of high speed communications, for instance, via FireWire®, Universal Serial Bus® (USB) 2 or 3, and/or Thunderbolt®, Gigabyte Ethernet®.

The networked environment 200 also comprises one or more end user client entity associated processor-based systems 206 (only one illustrated). The end user client entity associated processor-based systems 206 are communicatively coupled to the matching service server computer system(s) 202 by one or more communications channels, for example, one or more wide area networks (WANs) 210, for instance the Internet or Worldwide Web portion thereof.

In operation, the end user client entity associated processor-based systems 206 typically function as a client to the matching service server computing system 202. In operation, the matching service server computer system(s) 202 typically functions as a server to receive requests from the end user client entity associated processor-based systems 206, to determine matches between various end user client entities, and to provide the determined matches to at least some of the end user client entities for consideration. The requests may include information, for example, an end user client entity's own aspects, attributes, or characteristics. These are typically self-reported, but may be obtained in other ways. Additionally, or alternatively, the information may, for example, include desired aspects, attributes, or characteristics desired in others by the end user client entity in order to form a relationship. Additionally, or alternatively, the information may, for example, include responses to surveys. In particular, the information may include responses to surveys provided by the matching service server computer system(s) 202 to end user client entities that the matching service server computer system(s) 202 deem to be in a successful relationship (e.g., successful match or pairing). Such surveys may, for instance, be provided to the end user client entity as part of terminating an account with the matching service, and receipt of responses to the survey may optionally be a precondition to termination of the account.

The networked environment 200 may employ other computer systems and network equipment, for example, additional servers, proxy servers, firewalls, routers and/or bridges. The matching service server computer system(s) 202 will at times be referred to in the singular herein, but this is not intended to limit the embodiments to a single device since in typical embodiments there may be more than one matching service server computer system(s) 202 involved. Unless described otherwise, the construction and operation of the various blocks shown in FIG. 2 are of conventional design. As a result, such blocks need not be described in further detail herein, as they will be understood by those skilled in the relevant art.

The matching service server computer system(s) 202 may include one or more processing units 212a, 212b (collectively 212), a system memory 214 and a system bus 216 that couples various system components, including the system memory 214 to the processing units 212. The processing units 212 may be any logic processing unit, such as one or more central processing units (CPUs) 212a, digital signal processors (DSPs) 212b, application-specific integrated circuits (ASICs), field programmable gate arrays (FPGAs), etc. The system bus 216 can employ any known bus structures or architectures, including a memory bus with memory controller, a peripheral bus, and/or a local bus. The system memory 214 includes read-only memory ("ROM") 218 and random access memory ("RAM") 220. A basic input/output system ("BIOS") 222, which can form part of the ROM 218, contains basic routines that help transfer information between elements within the matching service server computer system(s) 202, such as during start-up.

The matching service server computer system(s) 202 may include a hard disk drive 224 for reading from and writing to a hard disk 226, an optical disk drive 228 for reading from and writing to removable optical disks 232, and/or a magnetic disk drive 230 for reading from and writing to magnetic disks 234. The optical disk 232 can be a CD-ROM, while the magnetic disk 234 can be a magnetic floppy disk or diskette. The hard disk drive 224, optical disk drive 228 and magnetic disk drive 230 may communicate with the processing unit 212 via the system bus 216. The hard disk drive 224, optical disk drive 228 and magnetic disk drive 230 may include interfaces or controllers (not shown) coupled between such drives and the system bus 216, as is known by those skilled in the relevant art. The drives 224, 228 and 230, and their associated computer-readable media 226, 232, 234, provide nonvolatile storage of computer-readable instructions, data structures, program modules and other data for the matching service server computer system 202. Although the depicted matching service server computer system(s) 202 is illustrated employing a hard disk 224, optical disk 228 and magnetic disk 230, those skilled in the relevant art will appreciate that other types of computer-readable media that can store data accessible by a computer may be employed, such as WORM drives, RAID drives, magnetic cassettes, flash memory cards, digital video disks ("DVD"), Bernoulli cartridges, RAMs, ROMs, smart cards, etc.

Program modules can be stored in the system memory 214, such as an operating system 236, one or more application programs 238, other programs or modules 240 and program data 242. Application programs 238 may include instructions that cause the processor(s) 212 to receive and automatically store aspect, attribute or characteristic information about the end user client entities 104 (FIG. 1) to the associated nontransitory computer- or processor-readable storage medium 204. Application programs 238 may also include instructions that cause the processor(s) 212 to receive desired aspect, attribute or characteristic information from the end user client entities, which indicate aspects, attributes or characteristics which a given end user client entity desires in another end user client entity in order to form a relationship. Application programs 238 may also include instructions that cause the processor(s) 212 to automatically process the stored aspect, attribute or characteristic information in light of the desired aspect, attribute or characteristic in order to find potential matches. Such is described in detail herein with reference to the various flow diagrams.

The application programs 238 may additionally include instructions that cause the processor(s) 212 to identify paired end user client entities that are in, or appear to be in, successful relationships (i.e., paired). The instructions may cause the processor(s) 212 to send surveys to those end user client entities that at least appear to be in successful relationships, and to receive responses to at least some of the surveys from at least some of the end user client entities. The instructions may additionally or alternatively cause the processor(s) 212 to send surveys to those end user client entities that wish to terminate an account with the matching service, and to receive responses to at least some of the surveys from at least some of the end user client entities. The instructions may cause the processor(s) 212 to analyze the survey results, and use such to update matching algorithms to generate or produce matches with a higher probability of successful pairing.

The application programs 238 may further include instructions that cause the processor(s) 212 to monitor end user client entity actions, determine response characteristics based on such, and update matching algorithms based on such. For instance, as explained below, the instructions may take into account whether an end user client entity is currently active (e.g., logged on), a frequency of being logged on, duration of time spent logged on, frequency of responding to being messaged or approached, and/or an assessment of the popularity of the end user client entity (e.g., number or rate of messages, number or rate of being matched). For instance, as explained below, the instructions may take into account viewing and/or messaging of other end user client entities who have aspects, attributes or characteristics that differ from the desired aspects, attributes or characteristics explicitly or expressly identified by the end user client entity. Such may indicate that the end user client entity is actually interested in matches based on aspects, attributes or characteristics that are different from those that the end user client entity specified.

The application programs 238 may further include instructions that cause the processor(s) 212 to identify comparative end user client entities who may have similar desires to that of a particular end user entity and such may serve as a proxy. The instructions may cause the processor(s) 212 to take into account the actions of these comparative end user clients in generating matches or potential matches for a given or subject end user client entity.

The instructions may cause any or even all of the above to be factored into generation of potential matches.

Application programs 238 may include instructions that cause the processor(s) 212 to automatically control access to certain information based on certain criteria. For example, the instructions may limit other end user client entities from seeing information about a specific end user client entity, unless the specific end user client entity has previously identified the other end user client entity to receive access to the access-related information. Application programs 238 may include instructions that cause the processor(s) 212 to automatically send, transmit, transfer, or otherwise provide electronic communications (e.g., messages, replies or responses) between end user client entities 104. Such may include sending, transmitting, transferring or otherwise providing access to electronic or digital messages, with or without images to end user client entities identified as a potential match. Such may facilitate seamless contact and establishment of relationships between various end user client entities.

Application programs 238 may include instructions that cause the processor(s) 212 to automatically establish, maintain, update or record relationship information. Such may include a representation of relationships (e.g., social, business) between end user client entities 104. Such may include updating records in a database or table.

Application programs 238 may include instructions that cause the processor(s) 212 to automatically establish, maintain, update or record information ownership information with respect to electronic or digital documents or files or data, as well as privileges, permissions or authorizations to perform various acts on such electronic or digital documents or files such as reading, modifying, annotating, extracting, importing, retrieving, and/or deleting. Application programs 238 may even further include instructions to create entries in and/or query one or more databases which store information or data about end user client entities, regardless of location at which those electronic or digital documents or data are stored.

Other program modules 240 may include instructions for handling security such as password or other access protection and communications encryption.

The system memory 214 may also include communications programs, for example, a server 244 that causes the matching service server computer system 202 to serve electronic information or files via the Internet, intranets, extranets, telecommunications networks, or other networks as described below. The server 244 in the depicted embodiment is markup language based, such as Hypertext Markup Language (HTML), Extensible Markup Language (XML) or Wireless Markup Language (WML), and operates with markup languages that use syntactically delimited characters added to the data of a document to represent the structure of the document. A number of suitable servers may be commercially available such as those from Mozilla, Google, Microsoft and Apple Computer.

While shown in FIG. 2 as being stored in the system memory 214, the operating system 236, application programs 238, other programs/modules 240, program data 242 and server 244 can be stored on the hard disk 226 of the hard disk drive 224, the optical disk 232 of the optical disk drive 228 and/or the magnetic disk 234 of the magnetic disk drive 230.

An operator can enter commands and information into the matching service server computer system(s) 202 through input devices such as a touch screen or keyboard 246 and/or a pointing device such as a mouse 248, and/or via a graphical user interface. Other input devices can include a microphone, joystick, game pad, tablet, scanner, etc. These and other input devices are connected to one or more of the processing units 212 through an interface 250 such as a serial port interface that couples to the system bus 216, although other interfaces such as a parallel port, a game port or a wireless interface or a universal serial bus ("USB") can be used. A monitor 252 or other display device is coupled to the system bus 216 via a video interface 254, such as a video adapter. The matching service server computer system(s) 202 can include other output devices, such as speakers, printers, etc.

The matching service server computer system(s) 202 can operate in a networked environment 200 using logical connections to one or more remote computers and/or devices. For example, the matching service server computer system(s) 202 can operate in a networked environment 200 using logical connections to one or more end user client processor-based systems 206. Communications may be via a wired and/or wireless network architecture, for instance, wired and wireless enterprise-wide computer networks, intranets, extranets, and/or the Internet. Other embodiments may include other types of communications networks including telecommunications networks, cellular networks, paging networks, and other mobile networks. There may be any variety of computers, switching devices, routers, bridges, firewalls and other devices in the communications paths between the matching service server computer system(s) 202, the end user client processor-based systems 206.

The end user client processor-based systems 206 will typically take the form of end user processor-based devices, for instance, personal computers (e.g., desktop or laptop computers), net book computers, tablet computers, smart phones, personal digital assistants, workstation computers and/or mainframe computers, and the like, executing appropriate instructions. These end user client processor-based systems 206 may be communicatively coupled to one or more server computers. For instance, end user client processor-based systems 206 may be communicatively coupled externally via one or more end user client entity server computers (not shown), which may implement a firewall. The client entity server computers 206 may execute a set of server instructions to function as a server for a number of end user client processor-based systems 206 (i.e., clients) communicatively coupled via a LAN at a facility or site, and thus act as intermediaries between the end user client processor-based systems 206 and the matching service server computer system(s) 202. The end user client processor-based systems 206 may execute a set of client instructions to function as a client of the server computer(s), which are communicatively coupled via a WAN.

The end user client processor-based systems 206 may include one or more processing units 268, system memories 269 and a system bus (not shown) that couples various system components including the system memory 269 to the processing unit 268. The end user client processor-based systems 206 will at times each be referred to in the singular herein, but this is not intended to limit the embodiments to a single end user client processor-based systems 206. In typical embodiments, there may be more than one end user client processor-based system 206 and there will likely be a large number of end user client processor-based systems 206.

The processing unit 268 may be any logic processing unit, such as one or more central processing units (CPUs), digital signal processors (DSPs), application-specific integrated circuits (ASICs), field programmable gate arrays (FPGAs), graphical processing units (GPUs), etc. Non-limiting examples of commercially available computer systems include, but are not limited to, an 80x86 or Pentium series microprocessor from Intel Corporation, U.S.A., a PowerPC microprocessor from IBM, a Sparc microprocessor from Sun Microsystems, Inc., a PA-RISC series microprocessor from Hewlett-Packard Company, a 68xxx series microprocessor from Motorola Corporation, an ATOM processor, or an A4 or A5 processor. Unless described otherwise, the construction and operation of the various blocks of the end user client processor-based systems 206 shown in FIG. 2 are of conventional design. As a result, such blocks need not be described in further detail herein, as they will be understood by those skilled in the relevant art.

The system bus can employ any known bus structures or architectures, including a memory bus with memory controller, a peripheral bus, and a local bus. The system memory 269 includes read-only memory ("ROM") 270 and random access memory ("RAM") 272. A basic input/output system ("BIOS") 271, which can form part of the ROM 270, contains basic routines that help transfer information between elements within the end user client computer systems 206, such as during start-up.

The end user client processor-based systems 206 may also include one or more media drives 273, e.g., a hard disk drive, magnetic disk drive, WORM drive, and/or optical disk drive, for reading from and writing to computer-readable storage media 274, e.g., hard disk, optical disks, and/or magnetic disks. The nontransitory computer-readable storage media 274 may, for example, take the form of removable media. For example, hard disks may take the form of a Winchester drive, and optical disks can take the form of CD-ROMs, while magnetic disks can take the form of magnetic floppy disks or diskettes. The media drive(s) 273 communicate with the processing unit 268 via one or more system buses. The media drives 273 may include interfaces or controllers (not shown) coupled between such drives and the system bus, as is known by those skilled in the relevant art. The media drives 273, and their associated nontransitory computer-readable storage media 274, provide nonvolatile storage of computer readable instructions, data structures, program modules and other data for the end user client processor-based systems 206. Although described as employing computer-readable storage media 274 such as hard disks, optical disks and magnetic disks, those skilled in the relevant art will appreciate that end user client processor-based systems 206 may employ other types of nontransitory computer-readable storage media that can store data accessible by a computer, such as magnetic cassettes, flash memory cards, digital video disks ("DVD"), Bernoulli cartridges, RAMs, ROMs, smart cards, etc. Data or information, for example, electronic or digital files or data or metadata related to such can be stored in the nontransitory computer-readable storage media 274.

Program modules, such as an operating system, one or more application programs, other programs or modules and program data, can be stored in the system memory 269. Program modules may include instructions for accessing a Website, extranet site or other site or services (e.g., Web services) and associated WebPages, other pages, screens or services hosted by the matching service server computer system 114.

In particular, the system memory 269 may include communications programs that permit the end user client processor-based systems 206 to exchange electronic or digital information or files or data or metadata with the matching service server computer system 202. The communications programs may, for example, be a Web client or browser that permits the end user client processor-based systems 206 to access and exchange information, files, data and/or metadata with sources such as Web sites of the Internet, corporate intranets, extranets, or other networks. Such may require that the end user client processor-based systems 206 have sufficient right, permission, privilege or authority for accessing a given Website, for example, one hosted by the matching service sever computer system(s) 202. The browser may, for example, be markup language based, such as Hypertext Markup Language (HTML), Extensible Markup Language (XML) or Wireless Markup Language (WML), and may operate with markup languages that use syntactically delimited characters added to the data of a document to represent the structure of the document.

While described as being stored in the system memory 269, the operating system, application programs, other programs/modules, program data and/or browser can be stored on the computer-readable storage media 274 of the media drive(s) 273. An operator can enter commands and information into the end user client processor-based systems 206 via a user interface 275 through input devices such as a touch screen or keyboard 276 and/or a pointing device 277 such as a mouse. Other input devices can include a microphone, joystick, game pad, tablet, scanner, etc. These and other input devices are connected to the processing unit 269 through an interface such as a serial port interface that couples to the system bus, although other interfaces such as a parallel port, a game port or a wireless interface or a universal serial bus ("USB") can be used. A display or monitor 278 may be coupled to the system bus via a video interface, such as a video adapter. The end user client processor-based systems 206 can include other output devices, such as speakers, printers, etc.

Figure 3:
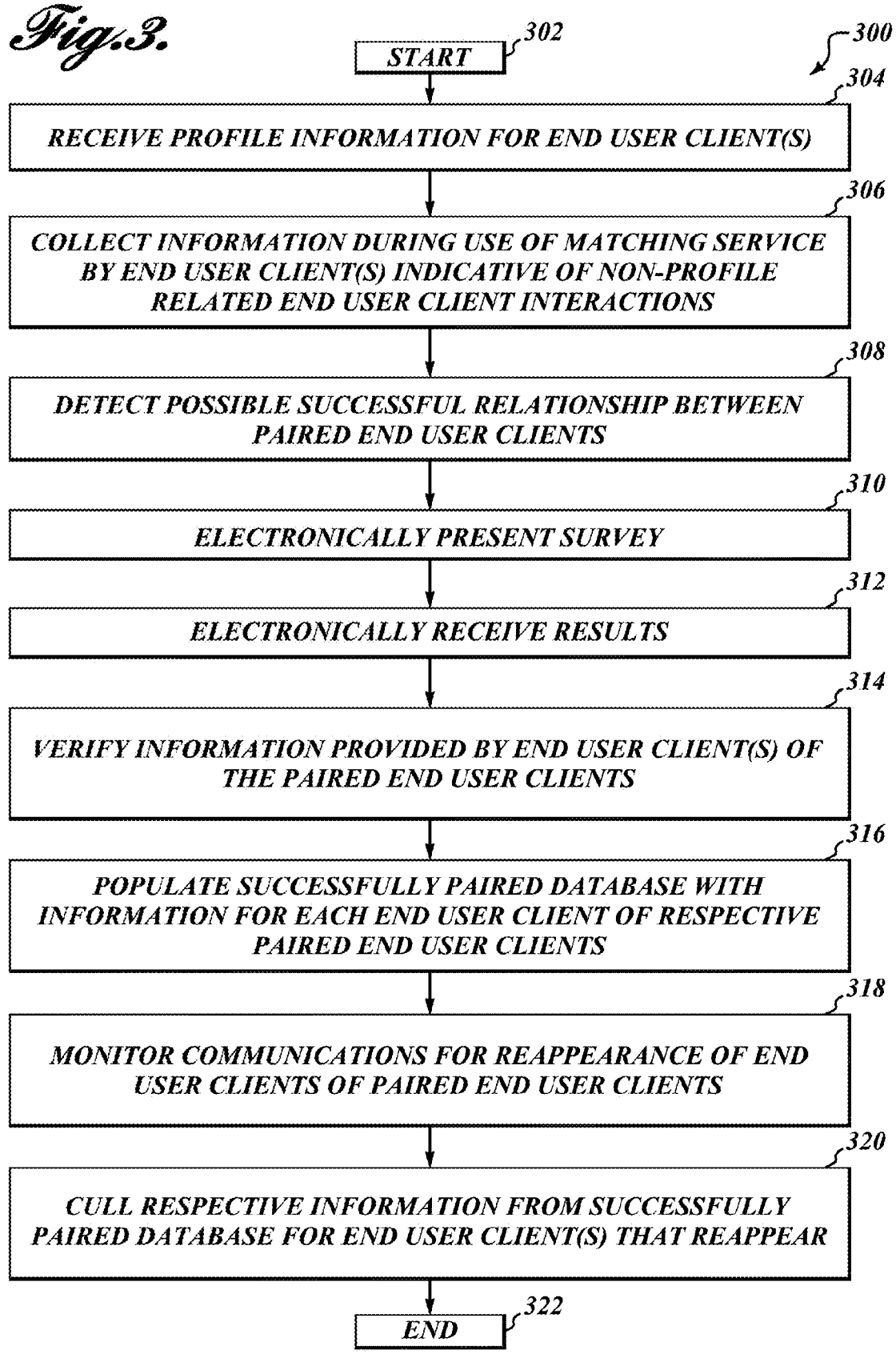
FIG. 3 is a flow diagram showing a high level method of operation of a matching service system to provide matching services and in particular to track and use information about successful matches, according to one illustrated embodiment.

FIG. 3 shows a high level method 300 of operating a matching service server computer system to provide matching services and in particular to track and use information about successful matches, according to one illustrated embodiment.

The matching services method 300 starts at 302. For example, the matching services method 300 may start on powering up of a component or device of the matching services system 106, for instance, powering up the matching services server computer system 114 or receipt of information or inquiries from end user client entities 104. Alternatively, the matching services method 300 may start in response to a launching of an application by an end user client entity, or in response to a call from a calling routine executing on an end user client processor-based system 110.

At 304, a matching service server computer system 114 receives profile information for end user client(s). Such may, for example, be in response to an end user client entity signing up, registering or opening an account for the matching service, or otherwise updating a user profile logically associated with the end user client entity or end user client account maintained by the matching service.

The profile information is typically self-reported by the end user client entity, but can come from other sources. The profile information may include aspects, attributes and/or characteristics that the particular end user possesses, but may also include aspects, attributes and/or characteristics that the particular end user desires in another entity in order to consider forming a relationship with that other entity. The profile information may take a variety of forms, particularly dependent on the specific application. For example, some information or data may be particularly relevant or useful where the matching service is directed to establishing social relationships, while other information or data may be particularly relevant or useful where the matching service is directed to establishing business relationships.

Examples of possible suitable profile information for social relationship related applications may include one or more of: sexual/gender preference, gender, age, height, weight, body type, ethnicity, income, religion, schooling (e.g., highest level), job, compiled personality test results, type of desired relationship (e.g., casual no commitment dating, dating, long term commitment), search type (e.g., long term, intimate encounter, dating, activity), smoker status (e.g., is/is not a smoker, will/will not match with a smoker), child status (e.g., has/do not have children, will/will not match with someone who has children, desires/does not desire children), marital status (e.g., single, married, separated, divorced), drug status (e.g., uses/does not use, will/will not match with some who uses or does not use drugs), birth month, horoscope, birth order.

At 306, the matching service server computer system 114 collects information during use of matching service by end user client(s) indicative of non-profile related end user client entity interactions. The information may be related to actions taken by the end user client entity, for example, sending of messages to other end user client entities or browsing actions. Thus, which of the matches proposed to the end user client entity the end user client entity decides to send a message to may be indicative of a preference of that particular end user entity. Also, which other end user entities the particular end user entity views the profiles of, messages and/or does not message after viewing the respective profile may be indicative of a preference of that particular end user entity. Time or duration spent viewing a profile, or hovering over a picture or image may be indicative of a preference of that particular end user entity. Many of these actions are discussed in detail below, for instance in reference to FIGS. 6-8.

At 308, the matching service server computer system 114 detects a possible successful relationship between a paired end user client entities. The matching service server computer system 114 may use a variety of techniques to detect a possible successful relationship. For example, the closing of one or both accounts associated with the respective end user client entities of a previously proposed match, reporting of a successful relationship by one or both end user client entities, or an absence from the matching service (e.g., failure to log in, failure to perform searches) for a prolonged period by one or both end user client entities. Such may be determined for a period following a proposal of a match or following an exchange of a message and reply by paired end user client entities. These examples are not intended to be exhaustive and other techniques may be employed.

At 310, the matching service server computer system electronically presents at least some of the end user clients of at least some of the paired end user clients with a survey. Such may, for instance, be in response to a request by one or both of the end user client entities in the pair to close their respective account(s). The survey may include inquiries about the successful pairing, as well as about unsuccessful pairings, and other aspects about the end user client entity's experiences with the matching service and the various matches proposed by the matching service. As previously noted, response to the survey may be a precondition of closing an account with the matching service.

At 312, the matching service server computer system electronically receives responses to the survey from at least some of the end user clients of at least some of the paired end user clients. Notably, these responses are self-reported, thus their accuracy may be somewhat in doubt. It has been noted that some individuals will rush through a survey, providing less than accurate results. For instance, some individuals will select a default value if given one, to complete the survey more quickly. In other instances, an individual may tend to provide responses or answers than make that individual look favorable to others. Such may be intentional or unintentional, but results in inaccurate information being collected.

Optionally, at 314, the matching service server computer system 114 verifies at least one piece of information provided by at least one of the end user clients of the paired end user clients. Verification can take many forms. Information may be verified against third party sources of information (e.g., FACEBOOK®, TWITTER®, LINKEDIN®). Information may be verified against other profiles created by the particular end user client entity on the matching service. Information may be verified using a priori knowledge of suspect information. For example, where a default value is selected once by the end user client entity, or where the end user client entity consistently selects default values where available, or when the response to the survey is completed too quickly relative to a defined threshold time.

At 316, the matching service server computer system 114 populates a successfully paired end user clients database with information for each of the end user clients of the respective paired end user clients. The matching service server computer system 114 may populate the successfully paired end user clients database with information received as responses to the survey from the respective end user clients of the pair. The matching service server computer system 114 may populate the successfully paired end user clients database with profile information for the respective end user clients of the pair. The matching service server computer system 114 may populate the successfully paired end user clients database with non-profile information for the respective end user clients of the pair, for example, information indicative of end user client entity activities (e.g., messaging, replying or responding, browsing) collected during use of the matching service.

At 318, matching service server computer system 114 may monitor communications for a re-appearance of any of the end users client entities of any of the paired end users clients. Re-appearance suggests that the relationship, and hence match, was not actually successful in either the short or long term. Thus, reliance on information from that purportedly successful pair to assess qualities or attributes that lead to successful matches may be misplaced. The matching service server computer system 114 may employ various techniques to detect a re-appearance of end user client entities. The monitoring of communications may include monitoring for a re-appearance of any of: a combination of a given name and a surname provided by the end user client entity or a screen name employed by the end user client entity. The monitoring of communications may include monitoring for a re-appearance of any of: an electronic mail address employed by the end user client entity, a piece of information stored in a cookie on a respective end user device logically associated with the end user client entity, or a browser profile for a browser logically associated with the end user client entity. These examples are not intended to be exhaustive and other techniques for detecting a re-appearance may be employed.

At 320, for the end user client entities that re-appear, the matching service server computer system 114 culls the respective information for at least the end user client that re-appears from the successfully paired end user clients database. Culling the respective information may include culling the respective information of both end user client entities of the paired end user client entities which includes the end user client entity that re-appears.

At 322, the high level matching services method 300 may terminate until called again. Alternatively, the high level matching services method 300 may repeat, for example, with control returning to 302 or 304. Additionally or alternatively, the high level matching services method 300 may run concurrently with other methods or processes, for example, as one of multiple threads on a multi-threaded processor system.

Figure 4:
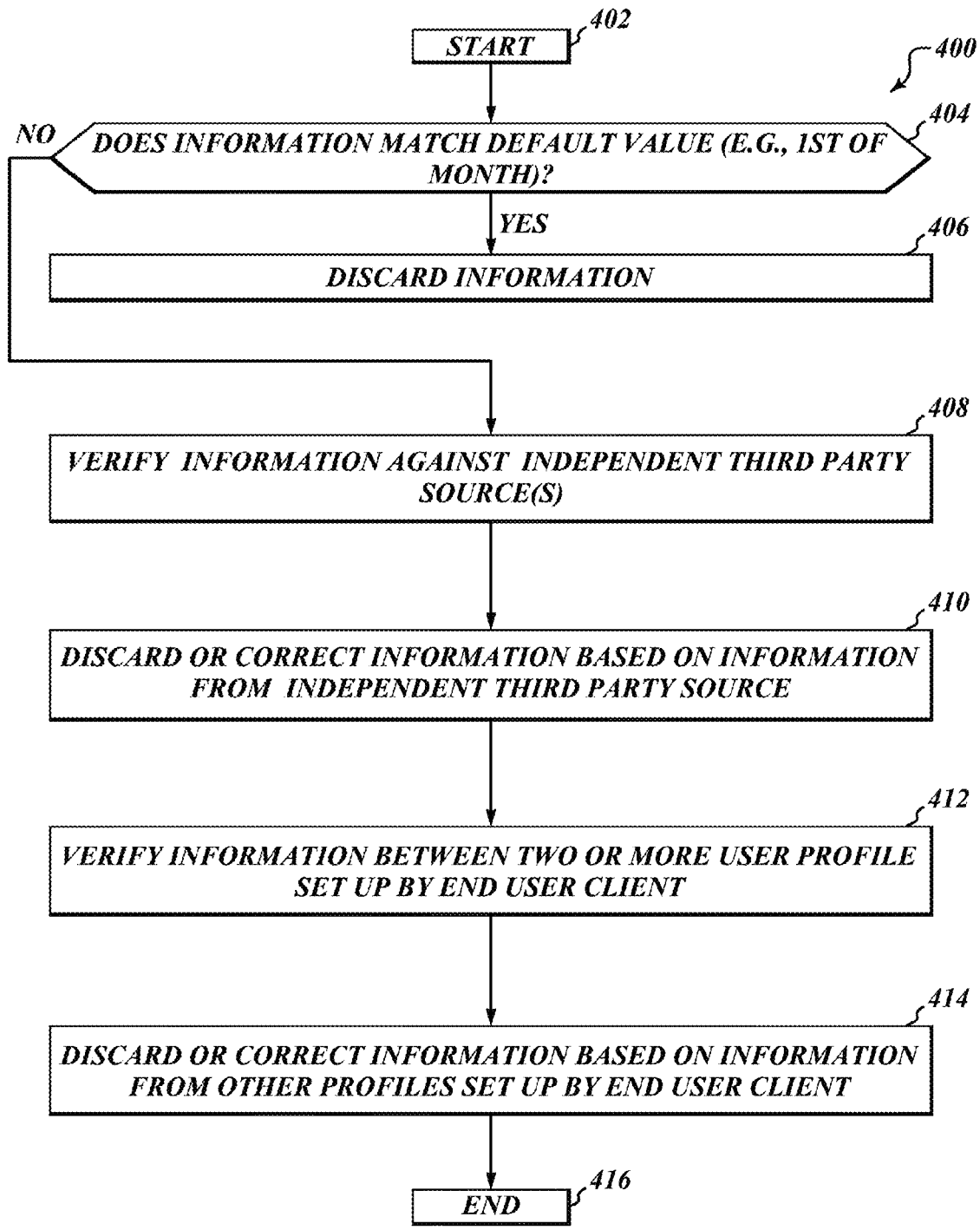
FIG. 4 is a flow diagram showing a low level method of operation of a matching service system to verify information, according to one illustrated embodiment.

FIG. 4 shows a low level method 400 of operating a matching service server computer system 114 to verify information, according to one illustrated embodiment. The low level information verification method 400 may be employed as part of, or in addition to, the high level method 300 (FIG. 3).

The low level information verification method 400 starts at 402. For example, the information verification method 400 may start on powering up of a component or device of the matching services system 106, for instance, powering up the matching services server computer system 114 or in response to a call from the matching services method 300 (FIG. 3). Alternatively, the information verification method 400 may start on receipt of information or inquiries from end user client entities 104. Alternatively, the information verification method 400 may start in response to a launching of an application by an end user client entity, or in response to a call from a calling routine executing on an end user client processor-based system 110.

At 404, a matching service server computer system 114 determines whether the at least one piece of information provided by the end user client matches a default value provided to the end user client. Much of the information received (e.g., end user client entity's aspects, attributes or characteristics) is typically self-reported. For a variety of reasons, self-reported information may be considered particularly suspect. Some end user client entities may rush to complete a profile or survey. Such may be a particular problem, for instance, where completion of an exit survey is required to terminate a relationship with a matching service. Particularly when rushing, some end user client entities may select a default option where default options are presented. For instance, all date fields (e.g., birth date) may offer one or more defaults (e.g., first of the month). Consequently, the matching service server computer system 114 may determine if, and/or how many times, a default value was selected, and whether such exceeds a threshold (e.g., single selection of default, all offered default values selected). If the threshold is exceed, the matching service server computer system 114 discards the information at 406. Otherwise, control passes to 408.

At 408, the matching service server computer system 114 verifies at least one piece of information provided by at least one of the end user clients of a paired end user clients information against independent third party source(s) of information. Again, for a variety of reasons self-reported information may be considered particularly suspect. For instance, many people may wish to present themselves in a favorable light, or may see themselves in a more favorable light than others may see them. The matching service server computer system 114 may use any one or more of a variety of techniques to verify the information. For example, the matching service server computer system 114 may verify information against third party sources of information about the particular end user client entity. The third party sources may include public sources, such as various social networking companies (e.g., FACEBOOK®, TWITTER®, LINKIN®), search engines (e.g., GOOGLE®, BINGO), proprietary databases (e.g., LEXUS-NEXUS®, "personals" advertisements of various media outlets), and/or other matching services. The third party sources may include other end user client entities of the matching service. Thus, an end user client entity may be asked to confirm certain information about another end user client entity with which they were matched and may therefore have personally met. The matching service server computer system 114 may review information for discrepancies, particular unexplained discrepancies such as differences in date of birth or other immutable characteristics. Differences may, for instance, include inconsistencies which, while variable in time and hence mutable, cannot each be concurrently true. Thus, an end user client entity should not have different marital statuses listed from two different sources at the same time.

Optionally at 410, the matching service server computer system 114 may discard information, or correct information based at least in part on information from independent third party source of information. Discarding the information prevents incorrect information from skewing analysis. Information may alternatively be corrected using information from other sources. Such may rely on two or more other sources or an unimpeachable source to try to determine which information is correct. In some instances, discarding of all information for the particular end user client entity may be desirable since one piece of incorrect information may suggest that other pieces of information are likely incorrect. In many instances, it may be impossible to verify these other pieces of information.

Optionally at 412, the matching service server computer system 114 may verify information against its own information. For example, the matching service server computer system 114 may verify information from one profile of an end user client entity against other profiles created or managed by the particular end user client entity. Those other profiles may have been created over a period of time, or may exist concurrently with the profile being verified.

Optionally at 414, the matching service server computer system 114 may optionally discard information, or correct information based at least in part on information from other user profiles set up by the respective end user client. Again, discarding the information prevents incorrect information from skewing analysis. Information may alternatively be corrected if such correct information is reliable, however the presence of one piece of incorrect information may suggest that other pieces of information are likely incorrect.

At 416, the low level information verification method 400 may terminate until called again. Alternatively, the low level information verification method 400 may repeat, for example, with control returning to 402 or 404. Additionally or alternatively, the low level information verification method 400 may run concurrently with other methods or processes, for example, as one of multiple threads on a multi-threaded processor system.

Figure 5:
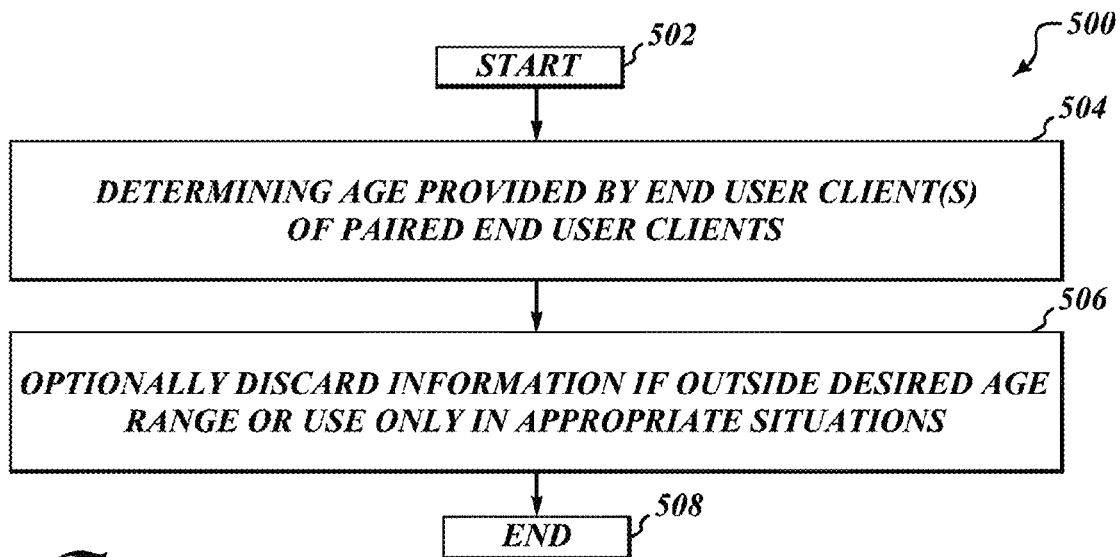
FIG. 5 is a flow diagram showing a low level method of operation of a matching service system to account for age related variation in matching criteria, according to one illustrated embodiment.

FIG. 5 shows a low level method 500 of accounting for age related variation in matching criteria, according to one illustrated embodiment. The low level age related variation accounting method 500 may be employed as part of, or in addition to, the high level method 300 (FIG. 3).

The low level age related variation accounting method 500 starts at 502. For example, the age related variation accounting method 500 may start on powering up of a component or device of the matching services system 106, for instance powering up the matching services server computer system 114 or in response to a call from the matching services method 300 (FIG. 3). Alternatively, the age related variation accounting method 500 may start on receipt of information or inquiries from end user client entities 104. Alternatively, the age related variation accounting method 500 may start in response to a launching of an application by an end user client entity, or in response to a call from a calling routine executing on an end user client processor-based system 110.

At 504, the matching service server computer system 114 determines an age provided by end user client(s) of paired end user client entities. The age information may be stored as part of an end user client entity's profile, on some nontransitory computer- or processor-readable storage media. The profile may list an age, but more likely will list either a birth date or year of birth from which the age may be calculated by the matching service server computer system 114.

At 506, the matching service server computer system 114 optionally discards information for an end user client entity who has an age that is outside a defined age range or group. In particular, age may demographically be indicative of a type of relationship desired. For instance, certain age ranges, for example, younger than 30, may generally be associated with more causal dating, while other age ranges may be generally associated with less causal dating, for instance over 30 may be generally associated with seeking a long term or committed relationship. Where data is being collected in a database for producing certain types of matches (e.g., long term or committed relationships), it may be advantageous to exclude data from a given demographic (e.g., under 30 years old) which might otherwise skew the results. Conversely, data from those under 30 may be useful to producing matches for shorter term relationships or intimate encounters.

The data in such a database may be used to directly generate matches. Additionally or alternatively, the data in such a database may be advantageously used to analyze and adjust matching algorithms which are used to generate matches. For example, the data may be stored to a successfully paired database which includes information about paired end user entities which are deemed successful (e.g., neither end user entity has returned to the matching service, has closed their account with the matching service, and/or searched for further matches). This data may be used to adjust matching algorithms, including generating or designing new matching algorithms. These matching algorithms may be applied to data in another database, for instance, an available end user clients database to generate matches for end user clients represented in the available end user clients database.

At 508, the age related variation accounting method 500 may terminate until called again. Alternatively, the age related variation accounting method 500 may repeat, for example, with control returning to 502 or 504. Alternatively, the age related variation accounting method 500 may run concurrently with other methods or processes, for example, as one of multiple threads on a multi-threaded processor system.

Figure 6:
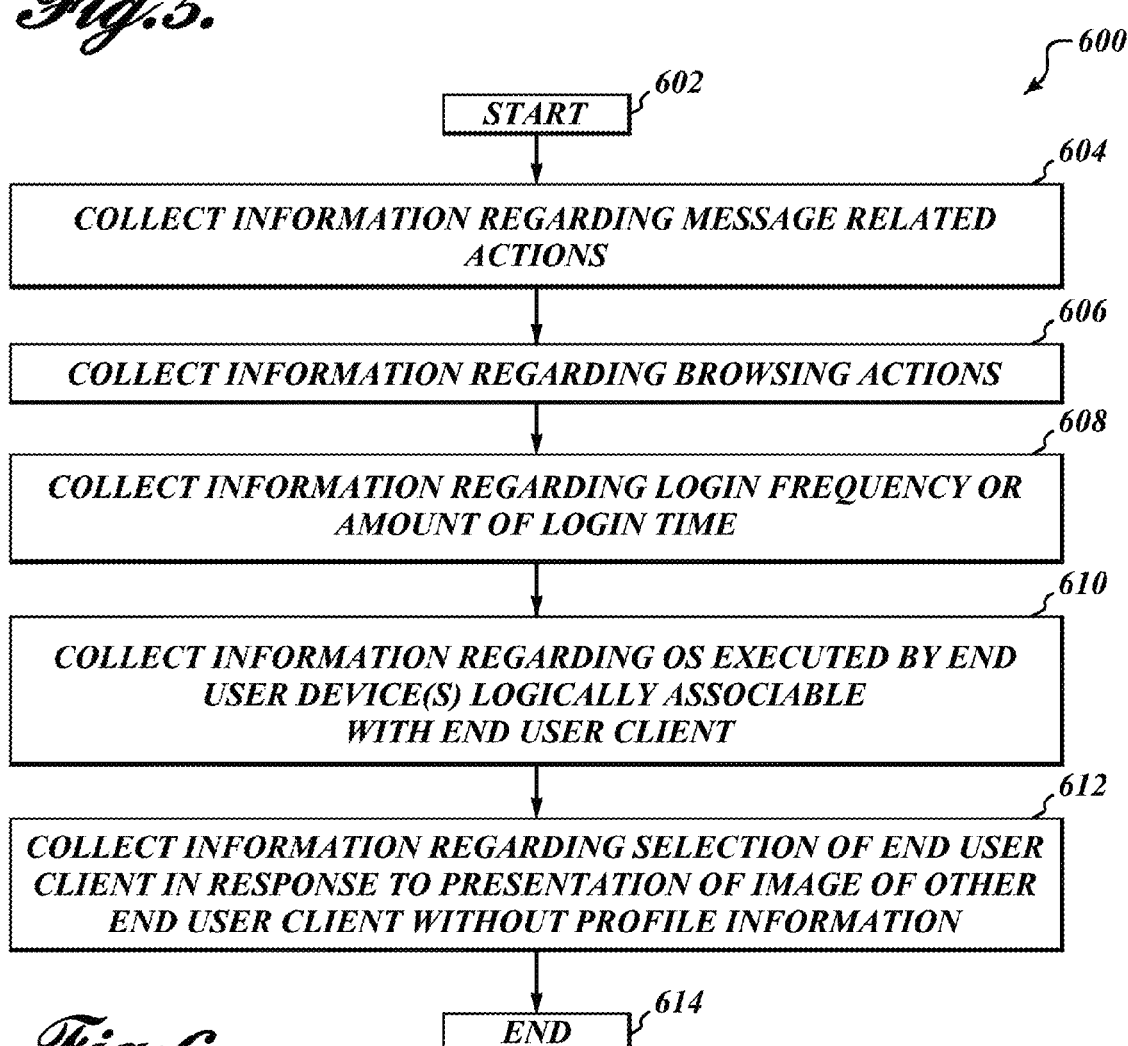
FIG. 6 is a flow diagram showing a low level method of operation of a matching service system to collect information during use of matching service by end user client(s) indicative of non-profile related end user client interactions via the matching service, according to one illustrated embodiment.

FIG. 6 shows a low level method 600 of collect information during use of matching service by end user client(s) indicative of non-profile related end user client interactions via the matching service, according to one illustrated embodiment. The low level information collection method 600 may be employed as part of, or in addition to, the high level method 300 (FIG. 3).

The low level non-profile related information collection method 600 starts at 602. For example, the non-profile related information collection method 600 may start on powering up of a component or device of the matching services system 106, for instance, powering up the matching services server computer system 114 or in response to a call from the matching services method 300 (FIG. 3). Alternatively, the non-profile related information collection method 600 may start on receipt of information or inquiries from end user client entities 104. Alternatively, the non-profile related information collection method 600 may start in response to a launching of an application by an end user client entity, or in response to a call from a calling routine executing on an end user client processor-based system 110.

At 604, a matching service server computer system 114 collects information regarding messaging related actions. The messaging related actions may take a variety of forms, and are generally attempts by a first end user client entity to contact a second end user client entity who the matching service may have identified as a match or potential match for the first end user client entity. Such attempted contacts are referred to as messaging or a message since these attempts typically come in the form of a message sent by the first end user client entity to the second end user client entity. Messages are typically in electronic form, such as electronic mail (e.g., email), text messages, short messaging service (SMS) messages, etc. Such messages may be generated by a component of the matching service system 106, thus the matching service server computer system 114 is aware of the sending of the message. Alternatively, a component executing on one or both end user client processor-based devices 110 may provide notification to the matching service server computer system 114 when a message is either sent to another end user client entity or received from another end user client entity.

The messaging related information regarding messaging related actions may take a variety of forms. For example, the information may include at least one of: a length of messages sent by the first end user client, a respective identity of other end user clients that the first end user client messages, a respective identity of other end user clients that the first end user client views and does not message, or an indication of a total number of views of another end user client by the first end user before the first end user client messages the other end user client. Also for example, the messaging related information may include at least one of: a respective identity of other end user clients to whose messages the first end user client does reply or a respective identity of other end user clients to whose messages the first end user client does not reply. As a further example, the messaging related information may include an indication of a frequency of messaging by the respective end user client.

At 606, the matching service server computer system 114 collects information regarding browsing actions. Such information may take a variety of forms. For example, browsing related information may include a total number of times a first end user client views a profile and/or image of another end user client. The browsing related information may include a total amount of time that the first end user client views or hovers over a profile and/or image of another end user client. The browsing related information may include information indicative of selections other end user clients by the first end user client, other than those recommended as matches to the first end user client.

At 608, the matching service server computer system 114 collects information regarding at least one of: login frequency or amount of login time. The logged in related information may include how frequently the end user client logs onto or into the matching service. The logged in related information may include how long the end user client remains logged onto or into the matching service. The logged in related information may include time(s) of day and/or days, other temporal cycles indicative of when the end user client logs into or onto the matching service.

Optionally at 610, the matching service server computer system 114 collects information regarding operating system (OS) executed by end user device(s) logically associable with end user client. Operating system choice or preference may be used as a parameter or criteria in assessing candidates for a potential match. The OS is readily apparent to the matching service server computer system 114 when communicating with a particular end user client processor-based device.

At 612, the matching service server computer system 114 collects information regarding selection of end user client in response to presentation of image of other end user client without profile information. Such may reflect an instinctive reaction of the end user client based solely on visual appearance without regard to profile information typically provided to the end user client.

At 614, the non-profile related information collection method 600 may terminate until called again. Alternatively, the non-profile related information collection method 600 may repeat, for example with control returning to 602 or 604. Alternatively, the non-profile related information collection method 600 may run concurrently with other methods or processes, for example, as one of multiple threads on a multi-threaded processor system.

Figure 7:
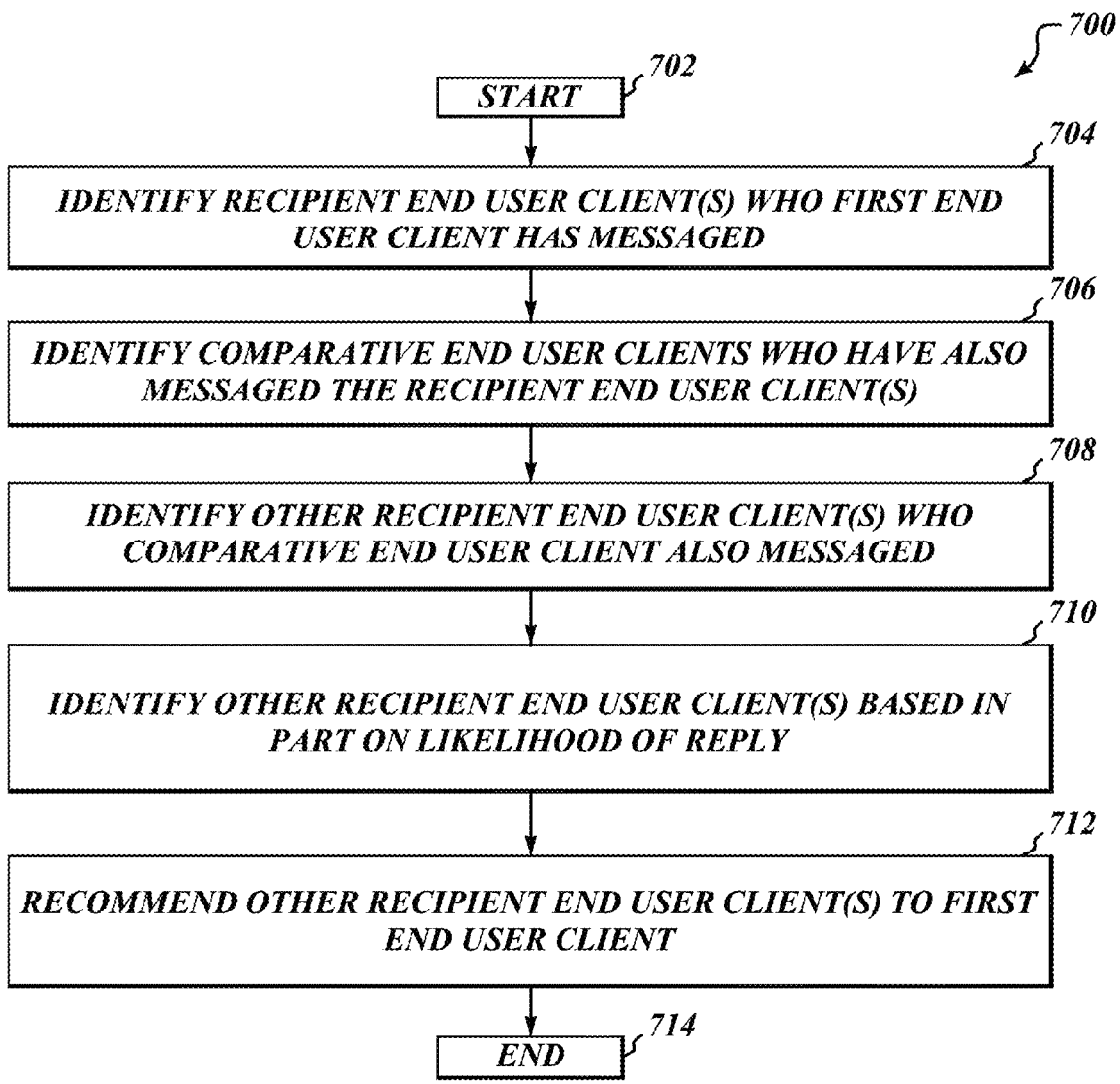
FIG. 7 is a flow diagram showing a low level method of operation of a matching service system to generate recommended matches based on comparisons to other end user client entities, according to one illustrated embodiment.

FIG. 7 shows a low level method 700 of generating recommended matches based on comparisons to other end user client entities, according to one illustrated embodiment. The low level comparative based match recommendation method 700 may be employed as part of, or in addition to, the high level method 300 (FIG. 3).

The low level comparative based match recommendation method 700 starts at 702. For example, the comparative based match recommendation method 700 may start on powering up of a component or device of the matching services system 106, for instance powering up the matching services server computer system 114 or in response to a call from the matching services method 300 (FIG. 3). Alternatively, the comparative based match recommendation method 700 may start on receipt of information or inquiries from end user client entities 104. Alternatively, the comparative based match recommendation method 700 may start in response to a launching of an application by an end user client entity, or in response to a call from a calling routine executing on an end user client processor-based system 110.

At 704, the matching service server computer system 114 identifies one or more recipient end user clients who a first or subject end user client has messaged. As previously noted, the matching service system 106 may generate the messages and/or otherwise control or moderate electronic communications. Additionally or alternatively, the matching service system 106 may receive notifications, for instance from an application or applet running or executing on end user client processor-based devices 110.

At 706, the matching service server computer system 114 identifies comparative end user clients who are similar in some respect to the first or subject end user client. In particular, the matching service server computer system 114 may identify as comparative end user clients, those who have also messaged the same recipient end user client(s) as the first or subject end user client. Messaging one or more of the same recipient end user clients demonstrates some shared desires between the first or subject end user client and the comparative end user client(s). The larger number of overlaps in messaging of recipient end user clients, the more likely that the shared similarities are significant, and thus that the comparative end user client(s) may serve as a good proxy for the first or subject end user client. The identified end user clients are denominated as "comparative" end user clients herein, indicating that they are selected by comparison to be used as proxies due to some similarity with the first or subject end user client.

The matching service server computer system 114 may, for example, identify the comparative end user client(s) by performing a single value decomposition. Also, for example, the matching service server computer system 114 may the comparative end user client(s) based at least in part on a total number of comparative end user clients who have messaged the same at least one other recipient end user client. Such may also account for frequency of messaging of the recipient end user client. For instance, a particular end user client may be uniformly popular, hence a high number or rate of message by the comparative end user client(s) may not be particularly indicative or informative of the preferences of the first or subject end user client.

At 708, the matching service server computer system 114 identifies other recipient end user client(s) who comparative end user clients also messaged. Again, the matching service server computer system 114 has access to information that indicates which end user clients have messaged which other end user clients (i.e., recipient of a message), as well as which recipient end user clients have replied or responded to the messages.

Optionally at 710, the matching service server computer system 114 may identify at least one other recipient end user client based at least in part on an evaluation of a likelihood that the at least one other recipient end user client will reply. Thus, the matching service server computer system 114 may identify possible matches, then refine or select the recipient end user clients most likely to reply or respond to a message. The matching service server computer system 114 may use any of a large variety of techniques to assess the likelihood that any particular recipient end user client may respond. Many of these techniques are described herein, for instance, with reference to FIG. 10.

At 712, the matching service server computer system 114 recommends other recipient end user client(s) to first or subject end user client. Such may include electronically sending profile information and/or one or more images to the end user client processor-based device 110 operated or associated with the first or subject end user client entity. The recommended match may include a hyperlink or other user actuatable control, that in response to selection by the first or subject end user sends or causes to be sent a message to the respective recipient end user client entity.

The comparative based match recommendation method 700 terminates at 714 until called again. Alternatively, the comparative based match recommendation method 700 may repeat, for example, with control returning to 702 or 704. Alternatively, the comparative based match recommendation method 700 may run concurrently with other methods or processes, for example, as one of multiple threads on a multi-threaded processor system.

Figure 8:
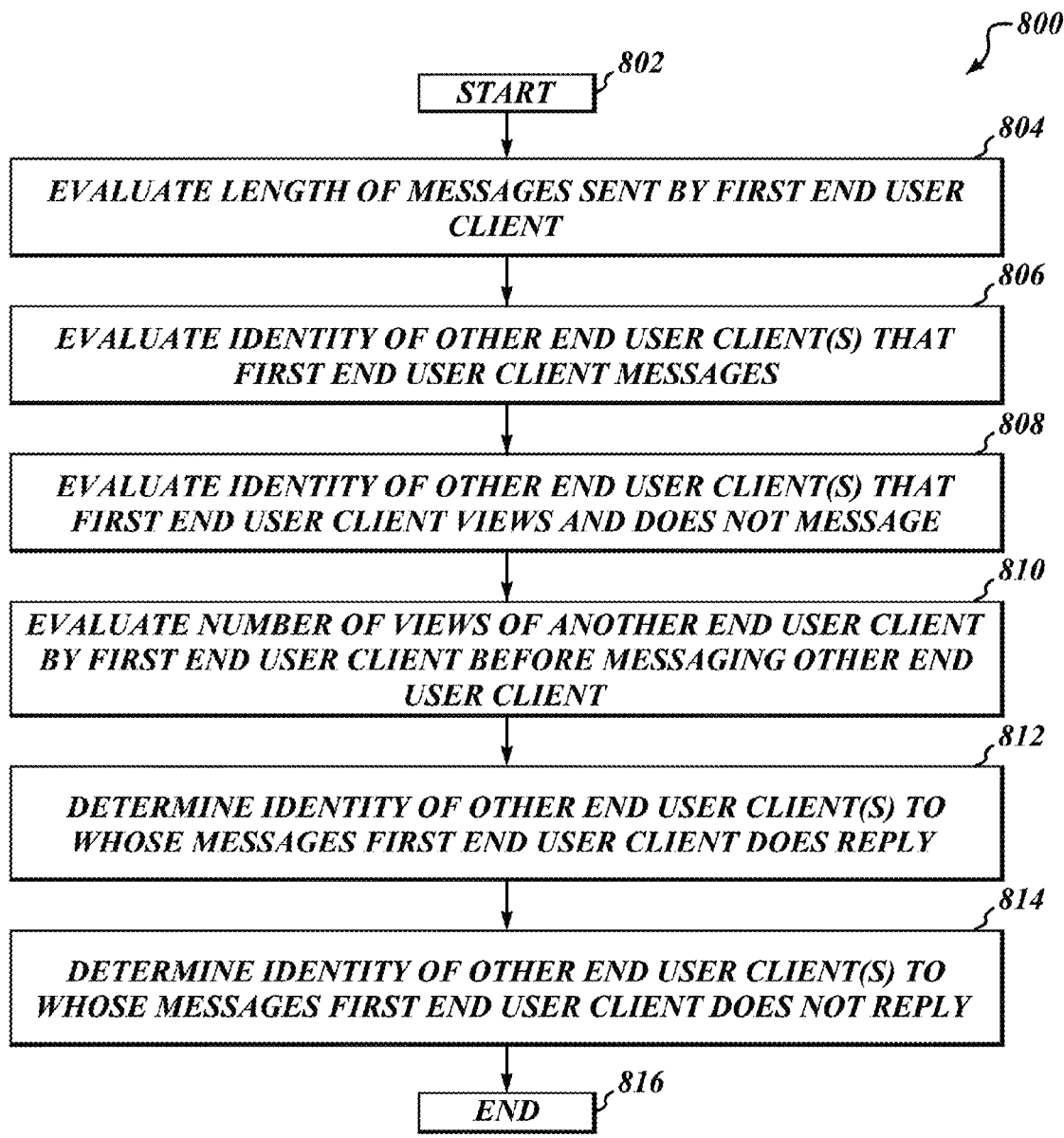
FIG. 8 is a flow diagram showing a low level method of operation of a matching service system to evaluate a given end user client entity's actions to be used in generating recommended matches, according to one illustrated embodiment.

FIG. 8 shows a low level method 800 of evaluating a given end user client entity's actions to be used in generating recommended matches, according to one illustrated embodiment. The low level end user client entity actions evaluation method 800 may be employed as part of, or in addition to, the high level method 300 (FIG. 3) or the comparative based match recommendation method 700 (FIG. 7).

An end user client entity's actual actions may be informative of the end user client entity's interest or desires. In some instances, these actions may be more informative that desired aspects, attributes or characteristics explicitly or expressly specified by the end user client entity. For instance, a given end user client entity may specify a desired for matches with those seeking a long term committed relationship. Yet, that same given end user client entity may routinely review profiles of end user clients who have specified intimate encounters or casual dating type relationships. The matching services system 106 may track end user client entity activities, discern aspects, attributes or characteristics which the particular given end user client may prefer and adjust its application of a matching algorithm accordingly to generate appropriate matches. Such may be in addition to or in place of some matches generated purely on the basis of the end user client's explicitly or expressly specified aspects, attributes or characteristics. Thus, a certain number or percentage of matches returned to the end user client may reflect the aspects, attributes or characteristics inferred by the matching services system 106 to be desirable to the end user client entity. Alternatively, certain variables or parameters of the matching algorithm may be adjusted to produce matches that take into account a wider range of preferences for any given aspects, attributes or characteristics than that explicitly or expressly specified by the given end user client entity.

The end user client entity actions evaluation method 800 starts at 802. For example, the end user client entity actions evaluation method 800 may start on powering up of a component or device of the matching services system 106, for instance powering up the matching services server computer system 114 or in response to a call from the matching services method 300 (FIG. 3) or comparative based match recommendation method 700 (FIG. 7). Alternatively, the end user client entity actions evaluation method 800 may start on receipt of information or inquiries from end user client entities 104. Alternatively, the end user client entity actions evaluation method 800 may start in response to a launching of an application by an end user client entity, or in response to a call from a calling routine executing on an end user client processor-based system 110.

At 804, the matching service server computer system 114 evaluates a respective length of messages sent by first end user client. Message length may be indicative of a level of interest in the recipient end user client.

At 806, the matching service server computer system 114 evaluates an identity of other end user client(s) that first end user client messages, and possibly the respective profiles of those other end user client(s). Such may be indicative of a level of interest in the recipient end user client(s).

At 808, the matching service server computer system 114 evaluates an identity of other end user client(s) that first end user client views and does not message. Such may also include evaluating the respective profiles of those other end user client(s). These may be indicative of a level of interest in the recipient end user client(s), for instance indicative of a lack of interest.

At 810, the matching service server computer system 114 evaluates a number of views of another end user client by first end user client before messaging other end user client. Such may be indicative of a level of interest in the recipient end user client(s). For example, repeated views followed by messaging may be indicative of a high level of interest.

At 812, the matching service server computer system 114 determines an identity of other end user client(s) to whose messages first end user client does reply. Again, such may be indicative of a level of interest in the recipient end user client(s).

At 814, the matching service server computer system 114 determines an identity of other end user client(s) to whose messages first end user client does not reply. Again, such may be indicative of a level of interest in the recipient end user client(s), for example, a low level or lack of interest.

The end user client entity actions evaluation method 800 terminates at 816 until called again. Alternatively, the end user client entity actions evaluation method 800 may repeat, for example, with control returning to 802 or 804. Alternatively, the end user client entity actions evaluation method 800 may run concurrently with other methods or processes, for example, as one of multiple threads on a multi-threaded processor system.

Figure 9:
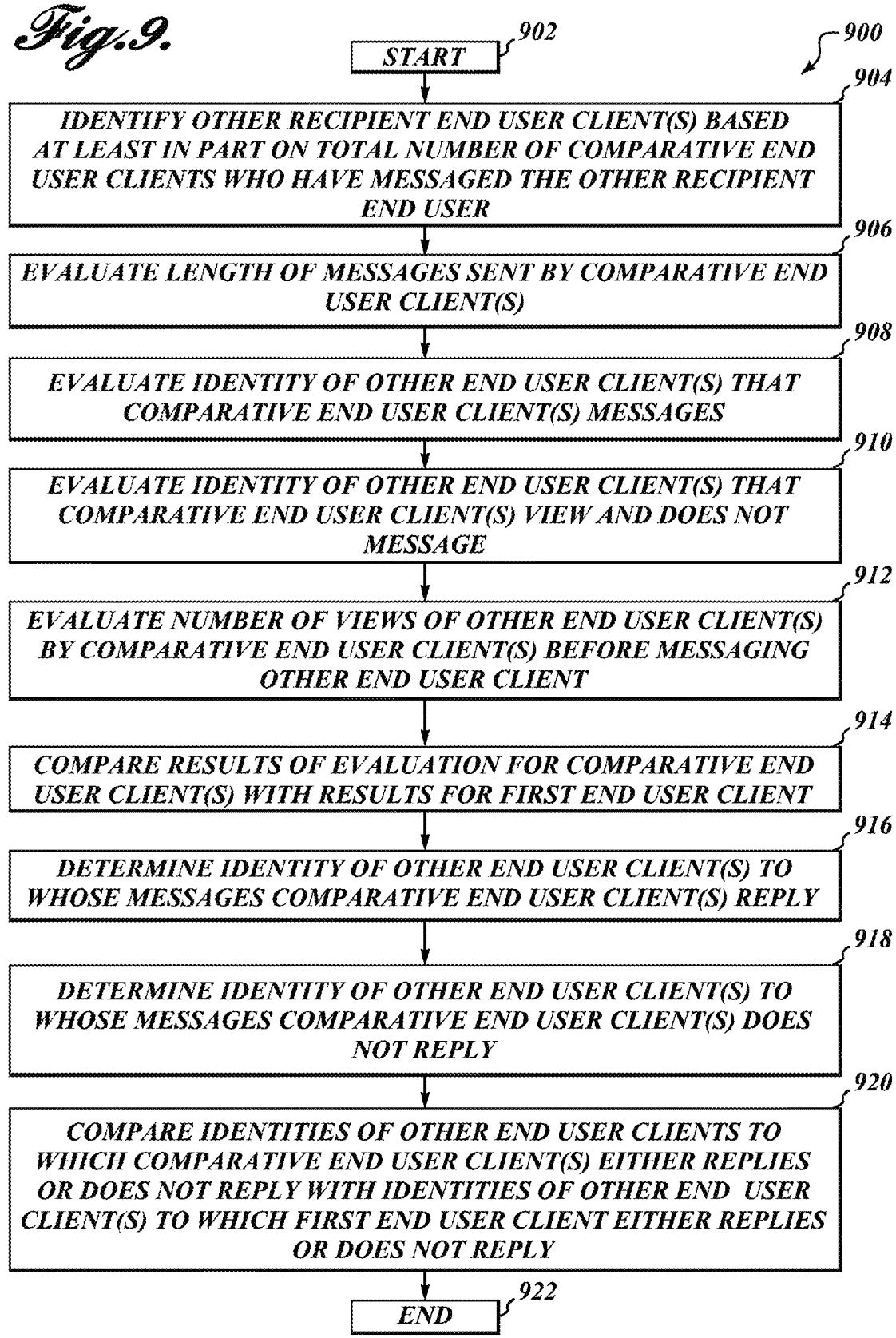
FIG. 9 is a flow diagram showing a low level method of operation of a matching service system to evaluate a comparative end user client entity's actions to be used in generating recommended matches, according to one illustrated embodiment.

FIG. 9 shows a low level method 900 of evaluating a comparative end user client entity's actions to be used in generating recommended matches, according to one illustrated embodiment. The low level comparative end user client entity actions evaluation method 900 may be employed as part of, or in addition to, the high level method 300 (FIG. 3) or the comparative based match recommendation method 700 (FIG. 7).

An end user client entity's actual actions may be informative of the end user client entity's interest or desires. Where comparative end user client(s) will be used in generating matches, the comparative end user client entity's actual actions may be informative of the comparative end user client entity's interest or desires. In some instances, these actions may be more informative than desired aspects, attributes or characteristics explicitly or expressly specified by the comparative end user client entity. The matching services system 106 may track end user client entity activities, discern aspects, attributes or characteristics which the particular given end user client may prefer and adjust its application of a matching algorithm accordingly to generate appropriate matches.

The comparative end user client entity actions evaluation method 900 starts at 902. For example, the comparative end user client entity actions evaluation method 900 may start on powering up of a component or device of the matching services system, for instance powering up the matching services server computer system 114 or in response to a call from the matching services method 300 (FIG. 3) or comparative based match recommendation method 700 (FIG. 7). Alternatively, the comparative end user client entity actions evaluation method 900 may start on receipt of information or inquiries from end user client entities 104. Alternatively, the comparative end user client entity actions evaluation method 900 may start in response to a launching of an application by an end user client entity, or in response to a call from a calling routine executing on an end user client processor-based system 110.

At 904, the matching service server computer system 114 identifies other recipient end user client(s) based at least in part on a total number of comparative end user clients who have messaged the other recipient end user client. Where a recipient end user client has been messaged by a relatively large number or high percentage of the comparative end user clients such indicates a likely high correlation with the desires of the first or subject end user client entity.

At 906, the matching service server computer system 114 evaluates length of messages sent by comparative end user client(s). Such may be indicative of a level of interest, for example, longer messages indicative of more interest. There may be an upper threshold where a message is so long that the length is not particularly indicative of a level of interest but rather is indicative of the end user client entity simply being verbose. Further, the matching service server computer system 114 may, for example, identify comparative end user client(s) which send duplicate messages to multiple end user clients with identical or near-identical text, and the length of the duplicate messages is not particularly indicative of a level of interest.

At 908, the matching service server computer system 114 evaluates identity of other end user client(s) that comparative end user client(s) messages. Such may also include evaluating the respective profiles of those other end user client(s). These may be indicative of a level of interest in the recipient end user client(s), for instance an indicative of a high level of interest.

At 910, the matching service server computer system 114 evaluates identity of other end user client(s) that comparative end user client(s) views and does not message. Such may also include evaluating the respective profiles of those other end user client(s). These may be indicative of a level of interest in the recipient end user client(s), for instance, indicative of a low level or lack of interest.

At 912, the matching service server computer system 114 evaluates number of views of other end user client(s) by comparative end user client(s) before messaging other end user client. Such may be indicative of a level of interest in the recipient end user client(s). For example, repeated views followed by messaging may be indicative of a high level of interest.

At 914, the matching service server computer system 114 compares results of evaluation for comparative end user client(s) with results of evaluation for first end user client. Again, such may be indicative of a level of interest in the recipient end user client(s).

At 916, the matching service server computer system 114 determines an identity of other end user client(s) to whose messages comparative end user client(s) reply. Again, such may be indicative of a level of interest in the recipient end user client(s).

At 918, the matching service server computer system 114 determines an identity of other end user client(s) to whose messages comparative end user client(s) does not reply. Again, such may be indicative of a level of interest in the recipient end user client(s), for example a low level or lack of interest.

At 920, the matching service server computer system 114 compares the identities of other end user clients to which comparative end user client(s) either replies or does not reply with identities of other end user client(s) to which first end user client either replies or does not reply. Again, such may be indicative of a level of interest in the recipient end user client(s).

The comparative end user client entity actions evaluation method 900 terminates at 922 until called again. Alternatively, the comparative end user client entity actions evaluation method 900 may repeat, for example, with control returning to 902 or 904. Alternatively, the comparative end user client entity actions evaluation method 900 may run concurrently with other methods or processes, for example, as one of multiple threads on a multi-threaded processor system.

Figure 10:
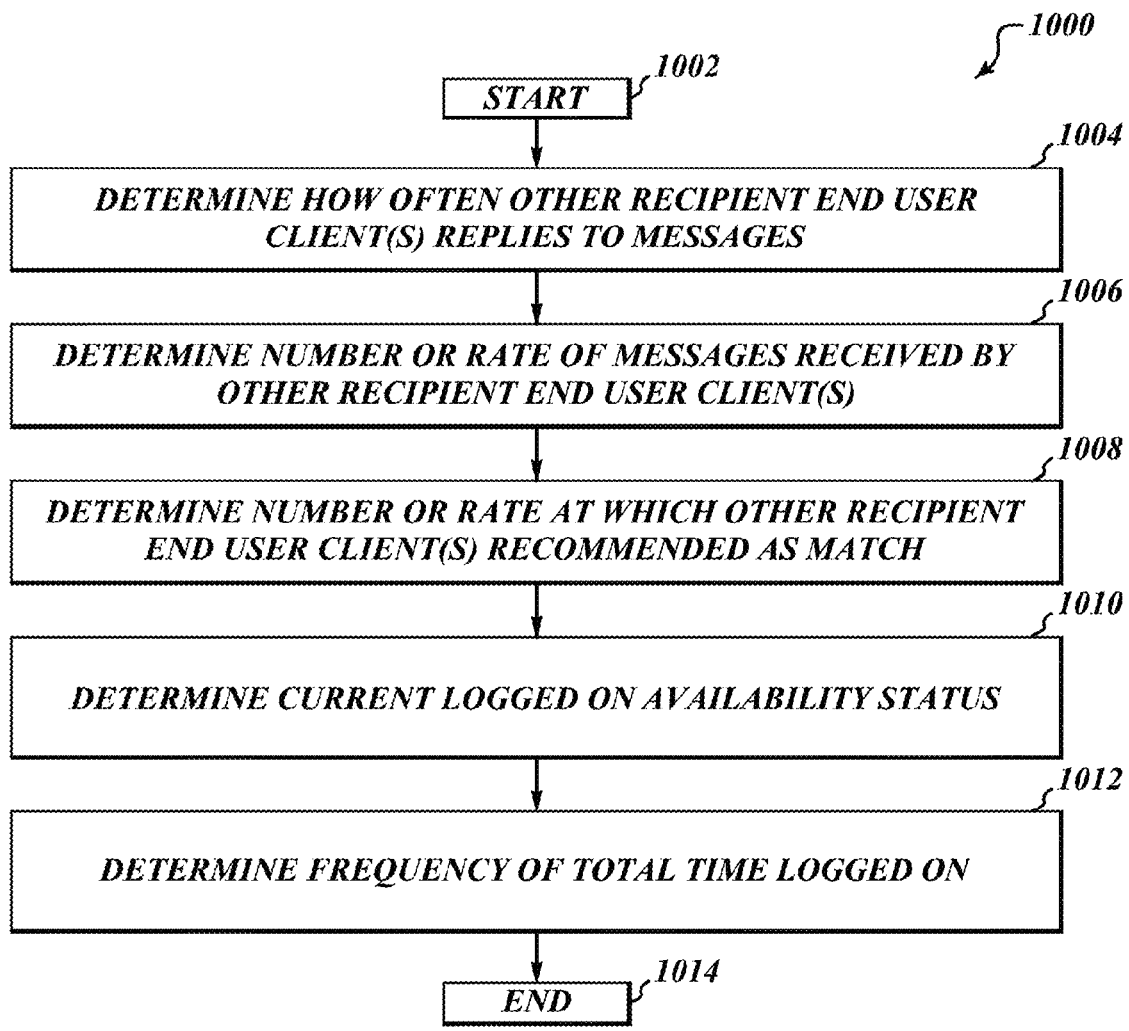
FIG. 10 is a flow diagram showing a low level method of operation of a matching service system to evaluate a likelihood of a recipient end user client replying to messaging, according to one illustrated embodiment.

FIG. 10 shows a low level method 1000 of evaluating a likelihood of a recipient end user replying to messaging, according to one illustrated embodiment. The low level recipient end user client entity evaluation method 1000 may be employed as part of, or in addition to, the high level method 300 (FIG. 3) or the comparative based match recommendation method 700 (FIG. 7).

End user client entities may become frustrated and disillusioned when their attempts to contact another end user client entity identified in a match fail, particularly where the other end user client completely fails to respond or reply to an attempted contact or message. There are numerous reasons why end user clients may fail to reply. For example, the end user client may simply not be interested in the end user client entity that is attempting to contact them. Alternatively, the end user client entity may be overwhelmed with messages. Additionally or alternatively, the end user client entity may not be logged into the matching service so may fail to timely see a message. In such situations, some end user client entities may later dismiss a previously received message as too old to bother with a response or reply. Screening potential matches for those that are likely to respond may alleviate the frustration and disillusionment.

The recipient end user client entity evaluation method 1000 starts at 1002. For example, the recipient end user client entity evaluation method 1000 may start on powering up of a component or device of the matching services system, for instance, powering up the matching services server computer system 114 or in response to a call from the matching services method 300 (FIG. 3) or comparative based match recommendation method 700 (FIG. 7). Alternatively, the recipient end user client entity evaluation method 1000 may start on receipt of information or inquiries from end user client entities 104. Alternatively, the recipient end user client entity evaluation method 1000 may start in response to a launching of an application by an end user client entity, or in response to a call from a calling routine executing on an end user client processor-based system 110.

At 1004, the matching service server computer system 114 determines how often other recipient end user client(s) replies to messages. As previously noted, the matching service server computer system 114 has access to information that indicates which end user clients have messaged which other end user clients (i.e., recipient of a message), as well as which recipient end user clients have replied or responded to the messages. Recipient end user client entities that have not replied or responded at a high rate in the past are likely to continue to not reply or respond at a high rate. Conversely, recipient end user client entities that have replied or responded at a high rate in the past are likely to continue to reply or respond at a high rate.

At 1006, the matching service server computer system 114 determines how many or a rate of messages received by other recipient end user client(s). Recipients that receive an inordinately high number of contacts or message will typically be less likely to respond to any given attempt to contact or message.

At 1008, the matching service server computer system 114 determines a number or rate at which other recipient end user client(s) are recommended as matches. Such may be indicative of the number or rate at which the recipient end user client(s) will receive future requests or messages. Again, a recipient end user client who is overwhelmed or receiving in inordinately high number of requests for contact or messages may be less likely to reply or respond to any given attempt to contact or message.

At 1010, the matching service server computer system 114 determines current logged on availability status for other recipient end user client(s). The matching service server computer system 114 has access to information that indicates which end user client entities are currently logged onto or into the matching service, when they log on, and for how long they remain logged on to the matching service in each login session. Recipients are typically more likely to respond to messages received while the recipient is logged on. In some instances, the messages may be time sensitive, for example, suggesting a meeting at some location at a given time. Time sensitivity may also in part be driven by a location of the end user client entity sending the message. In particular, the end user client entity sending the message may be in a location proximate the recipient for only a brief period so the opportunity to meet in person may be time sensitive.

At 1012, the matching service server computer system 114 determines frequency or total time logged on for other recipient end user client(s). Again, the matching service server computer system 114 has access to such information, and messages are more likely to be replied or responded to in real time than if hours or days old.

The recipient end user client entity evaluation method 1000 terminates at 1014 until called again. Alternatively, the recipient end user client entity evaluation method 1000 may repeat, for example, with control returning to 1002 or 1004. Alternatively, the recipient end user client entity evaluation method 1000 may run concurrently with other methods or processes, for example, as one of multiple threads on a multi-threaded processor system.

Figure 11:
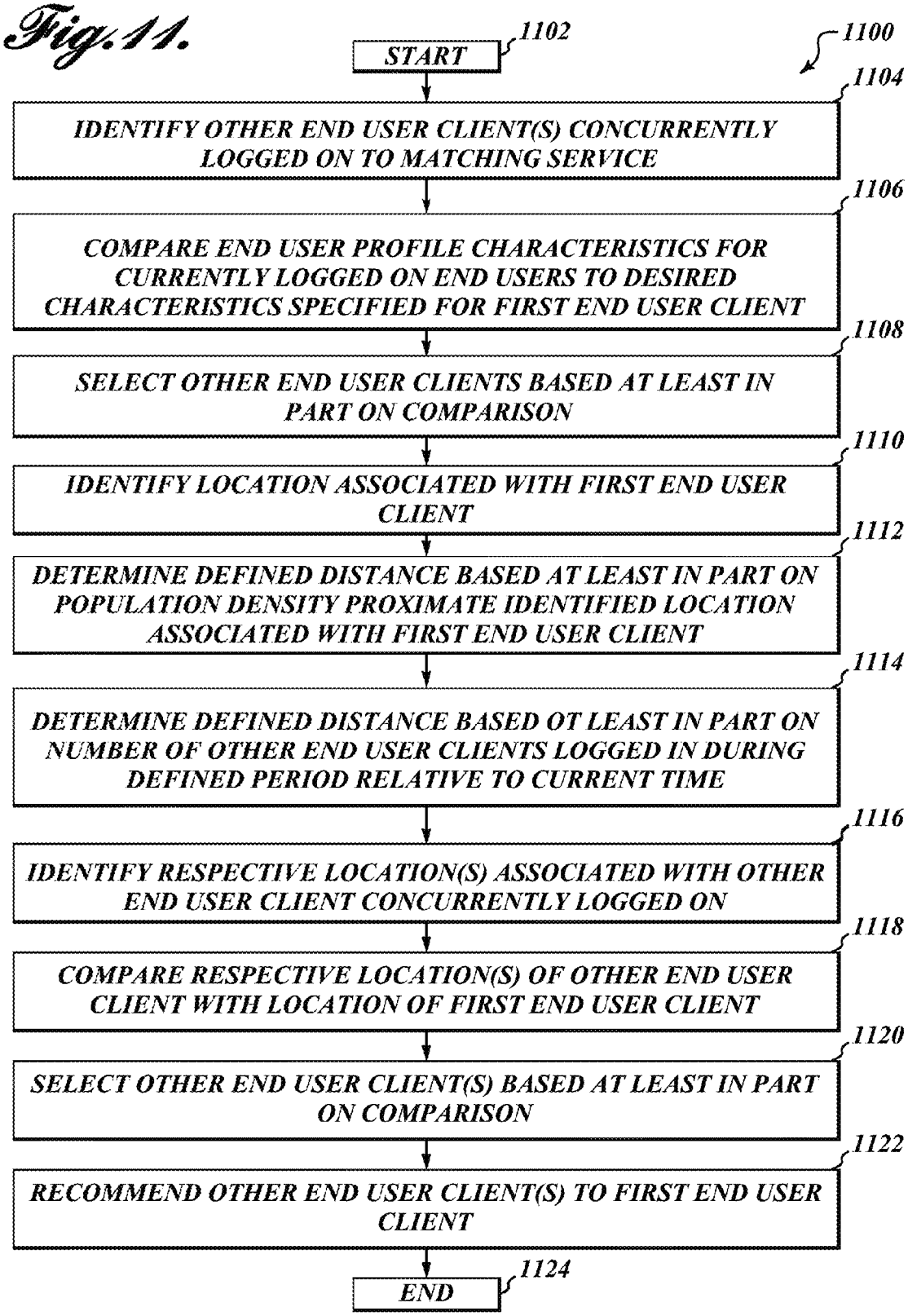
FIG. 11 is a flow diagram showing a low level method of operation of a matching service system to identify recipient end user clients for matching who will likely reply to messages due to temporal and spatial presence, according to one illustrated embodiment.

FIG. 11 shows a low level method 1100 of identifying recipient end user clients for matching who will likely replying to messages due to temporal and spatial presence, according to one illustrated embodiment. The low level recipient end user client entity evaluation method 1100 may be employed as part of, or in addition to, the high level method 300 (FIG. 3) or the comparative based match recommendation method 700 (FIG. 7).

It has been observed that a recipient end user client entity (i.e., one who is approached, or receives a request or message) is more likely to reply or respond if that recipient end user client entity is currently logged in (i.e., temporally present) to the matching service. A recipient end user client entity is also more likely to reply or respond if that recipient end user client entity is geographically proximate or feels geographically proximate (i.e., spatially present) to the end user client entity sending the message. Thus, screening potential matches based at least in part on these criteria or generating potential matches based at least in part on these criteria will produce matches that with an increased change of receiving a reply or response, alleviating frustration and disillusionment.

The temporal and spatial presence evaluation method 1100 starts at 1102. For example, the temporal and spatial presence evaluation method 1100 may start on powering up of a component or device of the matching services system 106, for instance powering up the matching services server computer system 114 or in response to a call from the matching services method 300 (FIG. 3) or comparative based match recommendation method 700 (FIG. 7). Alternatively, the temporal and spatial presence evaluation method 1100 may start on receipt of information or inquiries from end user client entities 104. Alternatively, the temporal and spatial presence evaluation method 1100 may start in response to a launching of an application by an end user client entity, or in response to a call from a calling routine executing on an end user client processor-based system 110.

At 1104, the matching service server computer system 114 identifies other end user client(s) concurrently logged on to the matching service. As previously noted, the matching service server computer system 114 has access to all accounts and may even control log access granted to the end user client entities.

At 1106, the matching service server computer system 114 compares end user profile characteristics for currently logged on end users to desired characteristics specified for first end user client. Such a comparison may be performed using any one or more of a variety of matching algorithms. Typically, these algorithms attempt to satisfy a number of constraints. The constraints may reflect aspects, attributes or characteristics desired by one end user client entity and purportedly possessed by another end user client entity. In many implementations the attempt to satisfy constraints will be bi-directional. That is, each end user client entity's specified desired characteristics will need to be at least partially satisfied by the other end user client entity profiled characteristics.

At 1108, the matching service server computer system 114 selects other end user clients based at least in part on comparison. As noted above, selection may be based on satisfaction of various criteria expressed as constraints. The number of criteria and/or level of satisfaction of any given criteria may be defined in any of a variety of ways.

At 1110, the matching service server computer system 114 identifies a location associated with the first end user client. The location may be a location specified in a user profile logically associated with the first end user client or an account associated with the first end user client. The location may, for instance, be a home address, work address, neighborhood, city, county, or parish.

Alternatively, the location may be a current location. The current location information may be provided by the first end user, for example in real time.

Alternatively, the matching service server computer system 114 may derive the current location information from communications with the end user device 110 being used by the first end user client. For instance, the matching service server computer system 114 may derive location information based on a IP address, internet service provider or telephone prefix associated with the end user device 110. The matching service server computer system 114 may derive location information from geographic coordinates (e.g., longitude, latitude) provided by the end user device 110. In some implementations, the matching service server computer system 114 may query the end user device 110 for location information. Such query may cause a client application executing on the end user device 110 to retrieve location information, for example via a global positioning system (GPS) receiver on the end user device 110, Wi-Fi geolocation or by triangulation with cellular towers. For instance, such may cause the end user device 110 to query a mobile switching station of a cellular service provider for coordinate information.

Optionally at 1112, the matching service server computer system 114 determines a defined distance or range, which may be based at least in part on a population density proximate identified location associated with first end user client. Such allow the matching service server computer system 114 to accommodate for the large variations in population density across a relatively large geographic area. For example, the population density may be relative high in major cities (e.g., New York, Hong Kong, London), while relatively low in small towns, or rural areas. What is deemed an acceptable distance for establishing a social relationship may be strongly affected by the population density. For instance, an end user client entity in New York City may have no need or desire to leave their own neighborhood, while still having a sufficiently large pool of prospects from which to select. Alternatively, an end user client entity in a rural area may need to travel (e.g., fifty miles, one hour) in order to have a sufficiently large pool of prospects from which to select.

Optionally at 1114, the matching service server computer system 114 determines a defined distance based at least in part on number of other end user clients logged in during defined period relative to current time. The total number of currently available end user client entities may significant affect the pool of prospects from which to select.

At 1116, the matching service server computer system 114 identifies respective location(s) associated with the other end user client concurrently logged on to matching service. As discussed above in reference to 1110, the matching service server computer system 114 may use a variety of techniques to identify or determine a location of the other end user(s). The technique(s) used may be different from the technique(s) used at 1110, or may be the same.

At 1118, the matching service server computer system 114 compares respective location(s) associated with other end user client with the location associated with first end user client. The matching service server computer system 114 may determine whether the identified respective location associated with the at least one other end user client is within a defined distance of the identified location associated with the respective end user client. The matching service server computer system 114 may employ "as the crow flies" or straight line measurements. Alternatively, the matching service server computer system 114 may take into account actual travel distances.

At 1120, the matching service server computer system 114 selects the at least one of the number of other end user clients based at least in part on the comparison. Typically, this may include selecting end user clients which have the aspects, attributes or characteristics desired by the other end user client, reducing the resulting set based whether the end user clients are currently available logged onto the matching service, and further reducing the resulting set based on geographic proximity.

This may be an iterative process. For example, if the final set of end user client entities is too small, the defined distance may be increased and a new resulting set generated. If the final set of end user client entities is too large, the defined distance may be decreased and a new resulting set generated At 1120, the matching service server computer system 114 recommends the other end user client(s) to first end user client. For example, the matching service server computer system 114 may transmit profiles and/or one or more images of the matched end user clients. Such may include a user selectable control (e.g., user selectable icon), selection of which causes a message to be generated to a respective one of the end user client entities.

The recipient end user client entity evaluation method 1100 terminates at 1122 until called again. Alternatively, the recipient end user client entity evaluation method 1100 may repeat, for example, with control returning to 1102 or 1104. Alternatively, the recipient end user client entity evaluation method 1100 may run concurrently with other methods or processes, for example, as one of multiple threads on a multi-threaded processor system.

FIG. 12 shows a low level method 1200 of displaying currently logged in matches to an end user client, according to one illustrated embodiment. The low level logged in match display method 1200 may be employed as part of, or in addition to, the high level method 300 (FIG. 3) or, for example, to recommend other end user client(s) to first end user client 1122 of method 1100 (FIG. 11).

At 1202, the matching service server computer system 114 causes display of a number of other end user clients within a defined distance, and optionally who are currently logged into the matching service or were logged on or are predicted to log on during a defined period relative to a current time. Such may be displayed as a map of a given area, with or without terrain images. A current location, or an approximate current location of each end user client entity may be displayed on the map. The display may include a user selectable icon, selection of which may bring up profile information and/or an image of the respective end user client entity.

FIG. 13 shows a low level method 1300 of adjusting a matching algorithm in response to end user client entity input, according to one illustrated embodiment. The low level algorithm adjustment method 1300 may be employed as part of, or in addition to, the high level method 300 (FIG. 3).

The recipient end user client entity evaluation method 1300 starts at 1302. For example, the recipient end user client entity evaluation method 1300 may start on powering up of a component or device of the matching services system 106, for instance, powering up the matching services server computer system 124 or in response to a call from the matching services method 300 (FIG. 3). Alternatively, the recipient end user client entity evaluation method 1300 may start on receipt of information or inquiries from end user client entities 104. Alternatively, the recipient end user client entity evaluation method 1300 may start in response to a launching of an application by an end user client entity, or in response to a call from a calling routine executing on an end user client processor-based system 120.

At 1304, the matching service server computer system 114 provides recommendations to an end user client at a first time. The recommendations may include matches or potential matches with other end user entity clients. Such may include profiles, images and/or other information. Such may also include user selectable icons, selection of which generates a message to the respective other end user client entity.

At 1306, the matching service server computer system 114 receives user input from the end user in response to the provided recommendations. A user interface may include one or more user selectable tools (e.g., tool bars, icons, pull-down menus, buttons, dialog boxes) which permit a user to provide input. The input may be indicative of a desire to change some aspect of a matching algorithm. The desire may be stated explicitly, or implicitly. Thus, the end user client entity may explicitly select a variable or parameter to change. Alternatively, the end user client entity may indicate a dislike of certain results or a preference for certain results.

At 1308, the matching service server computer system 114 adjusts a matching algorithm in response to the received user input. For example, the matching service server computer system 114 may change a weight associated with at least one variable or parameter, may add a variable or parameter, and/or delete a variable or parameter. The matching service server computer system 114 may, for example widen or narrow a range of acceptable values for a given variable or parameter.

The algorithm adjustment method 1300 terminates at 1310 until called again. Alternatively, the algorithm adjustment method 1300 may repeat, for example, with control returning to 1302 or 1304. Alternatively, the algorithm adjustment method 1300 may run concurrently with other methods or processes, for example, as one of multiple threads on a multi-threaded processor system.

FIG. 14 shows a low level method 1400 of adjusting a matching algorithm in response to end user client entity input, according to one illustrated embodiment. The low level algorithm adjustment method 1400 may be employed as part of, or in addition to, the high level method 300 (FIG. 3).

The recipient end user client entity evaluation method 1400 starts at 1402. For example, the recipient end user client entity evaluation method 1400 may start on powering up of a component or device of the matching services system 106, for instance powering up the matching services server computer system 124 or in response to a call from the matching services method 300 (FIG. 3). Alternatively, the recipient end user client entity evaluation method 1400 may start on receipt of information or inquiries from end user client entities 104. Alternatively, the recipient end user client entity evaluation method 1400 may start in response to a launching of an application by an end user client entity, or in response to a call from a calling routine executing on an end user client processor-based system 120.

At 1404, a matching service server computer system 114 monitors a plurality of end user client interactions with the matching service system by an end user client over time. The end user client interactions may take a variety of forms. Such may, for example include actions such as messaging other end user clients, replying to other end user clients, not messaging other end user clients who were proposed as matches, not replying to other end user clients sent messages. Such may, for example, include browsing and browsing related activities. For example, selections, number of selections and/or speed of selections. Selections may, for instance be selections of profiles or images to view. Also for example, an amount of time hovering with a cursor or pointer positioned over some region of a window or screen, such as over a portion in which a profile or image is displayed. Such may include times of the day, week or year when an end user client logs into the matching system, cumulative or average hours spent logged on, etc.

At 1406, the matching service server computer system 114 assesses a desired commitment type for the end user client based at least in part on the monitored end user client interactions. The assessed desired commitment type for the end user client may be different from a specified commitment type for the end user client, that was specified by the end user client. For instance, the end user client may specify an interest in a longer term or more serious match, yet may view a high number of profiles for other end users seeking short term, casual or intimate encounter type relationships. The end user may specify an interest in a certain bodily characteristic (e.g., hair color, weight, skin tone), yet may view a high number of profiles for other end users with a different bodily characteristic.

At 1408, the matching service server computer system 114 modifies a search algorithm for producing matches for the end user client based at least in part on the assessed desired commitment type for the end user client. For example, the matching service server computer system 114 may change a weight associated with at least one parameter or variable, may add a parameter or variable, delete a parameter or variable, or substitute one parameter or variable for another parameter or variable.

For instance, the matching service server computer system 114 may monitor a desired commitment type for each of a plurality of other end user clients that are at least one of messaged or replied to by the end user client. Also for instance, the matching service server computer system 114 may monitor a desired commitment type for each of a plurality of other end user clients that are browsed by the end user client. For instance, the matching service server computer system 114 may monitor at least one of a length of message or a frequency of messaging by the end user client. The matching service server computer system 114 then adjusts some aspect of the matching algorithm based on the monitored aspect.

The algorithm adjustment method 1400 terminates at 1410 until called again. Alternatively, the algorithm adjustment method 1400 may repeat, for example with control returning to 1402 or 1404. Alternatively, the algorithm adjustment method 1400 may run concurrently with other methods or processes, for example, as one of multiple threads on a multi-threaded processor system.

Figure 15:
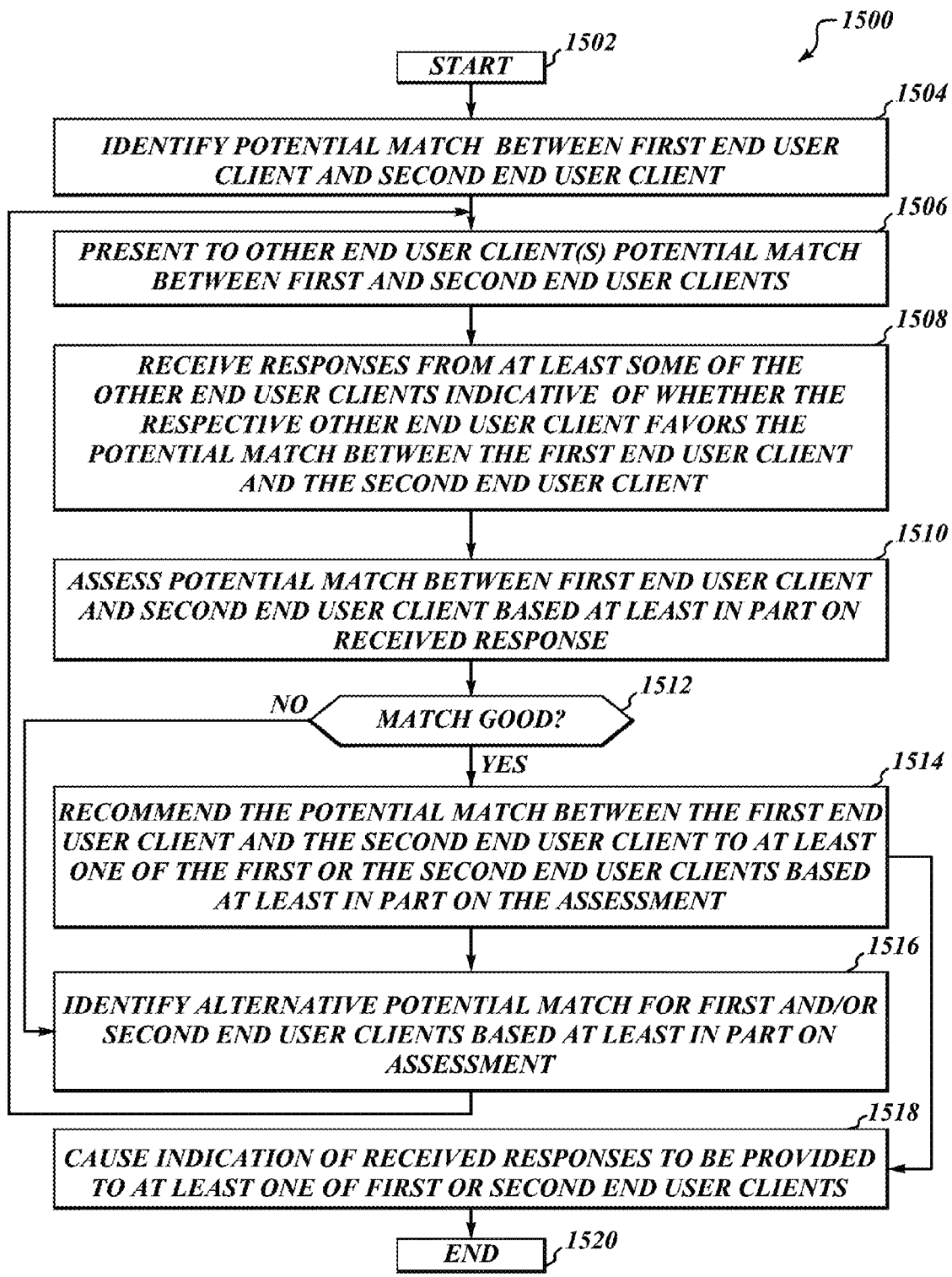
FIG. 15 is a flow diagram showing a low level method of operation of a matching service system to adjust a matching algorithm in response to other end user client entity input, according to one illustrated embodiment.

FIG. 15 shows a low level method 1500 of adjusting a matching algorithm in response to other end user client entity input, according to one illustrated embodiment. The low level algorithm adjustment method 1500 may be employed as part of, or in addition to, the high level method 300 (FIG. 3).

The recipient end user client entity evaluation method 1500 starts at 1502. For example, the recipient end user client entity evaluation method 1500 may start on powering up of a component or device of the matching services system 106, for instance powering up the matching services server computer system 124 or in response to a call from the matching services method 300 (FIG. 3). Alternatively, the recipient end user client entity evaluation method 1500 may start on receipt of information or inquiries from end user client entities 104. Alternatively, the recipient end user client entity evaluation method 1500 may start in response to a launching of an application by an end user client entity, or in response to a call from a calling routine executing on an end user client processor-based system 120.

At 1504, the matching service server computer system 114 identifies a potential or proposed match between a first end user client and a second end user client. The matching service server computer system 114 may use any one or more matching algorithms to identify potential or proposed matches. The matches may be of any of a large variety of types, for instance, matches for social relationships or business relationships. The matches may be based on any of a large variety of criteria, which will typically be specified by one or both end user clients.

At 1506, the matching service server computer system 114 presents to other end user client(s) potential or proposed match between first end user client and the second end user client. These other end user client(s) are end user clients other than the first and the second end user clients who are the subjects of the match.

At 1508, the matching service server computer system 114 receives responses from at least some of the other end user clients. The responses are indicative of whether the respective other end user client favors the potential or proposed match between the first end user client and the second end user client. The responses may be simple yes/no responses, or may have some gradation for instance rating the potential or proposed match on a scale (e.g., 1-3, 1-10).

At 1510, the matching service server computer system 114 assesses the potential or proposed match between the first end user client and the second end user client based at least in part on the received responses. The matching service server computer system 114 may use a simple polling system, and may reject or proposed all matches if a majority or some other percentage of responses are opposed to the match. The matching service server computer system 114 may employ more sophisticated algorithms, for example, weighting some response more heavily than other responses. For instances, responses from other end user clients that have some one or more pieces of profile information in common with the first and/or the second end user clients may be weighted more heavily. Other aspects in common may be taken into account in the weighting, for instance, a correspondence between actions (e.g., messaging, replying, browsing, selecting) by the other end user client and the first and/or the second end user clients. The weight(s) may be assigned in accordance with a strength of correlation.

At 1512, the matching service server computer system 114 determines whether the potential or proposed match is deemed to be a good match by the other end user clients.

If the potential or proposed match is deemed a good match, at 1514 the matching service server computer system 114 recommends the potential match between the first end user client and the second end user client to at least one of the first or the second end user clients based at least in part on the assessment. For example, the matching service server computer system 114 may forward a profile and/or image of at least one of the first or the second end user clients to the other one of the first or the second end user clients.

If the potential or proposed match is not deemed a good match, at 1516 the matching service server computer system 114 identifies an alternative potential or proposed match for at least one of the first end user client and/or the second end user client. Control then returns to 1506.

At 1518, the matching service server computer system 114 causes an indication of the received responses to be provided to at least one of the first or the second end user clients. Such may be provided along with the profile and/or images or other information as part of recommending the match 1514. Optionally, the matching service server computer system 114 may cause an indication of the received responses to be provided at least the other end user clients who participated in evaluating the potential or proposed match. Optionally, the matching service server computer system 114 may additionally or alternatively cause an indication of an outcome (e.g., successfully paired) of the potential or proposed match to be provided at least the other end user clients who participated in evaluating the potential or proposed match.

The algorithm adjustment method 1500 terminates at 1520 until called again. Alternatively, the algorithm adjustment method 1500 may repeat, for example with control returning to 1502 or 1504. Alternatively, the algorithm adjustment method 1500 may run concurrently with other methods or processes, for example, as one of multiple threads on a multi-threaded processor system.

Figure 16:
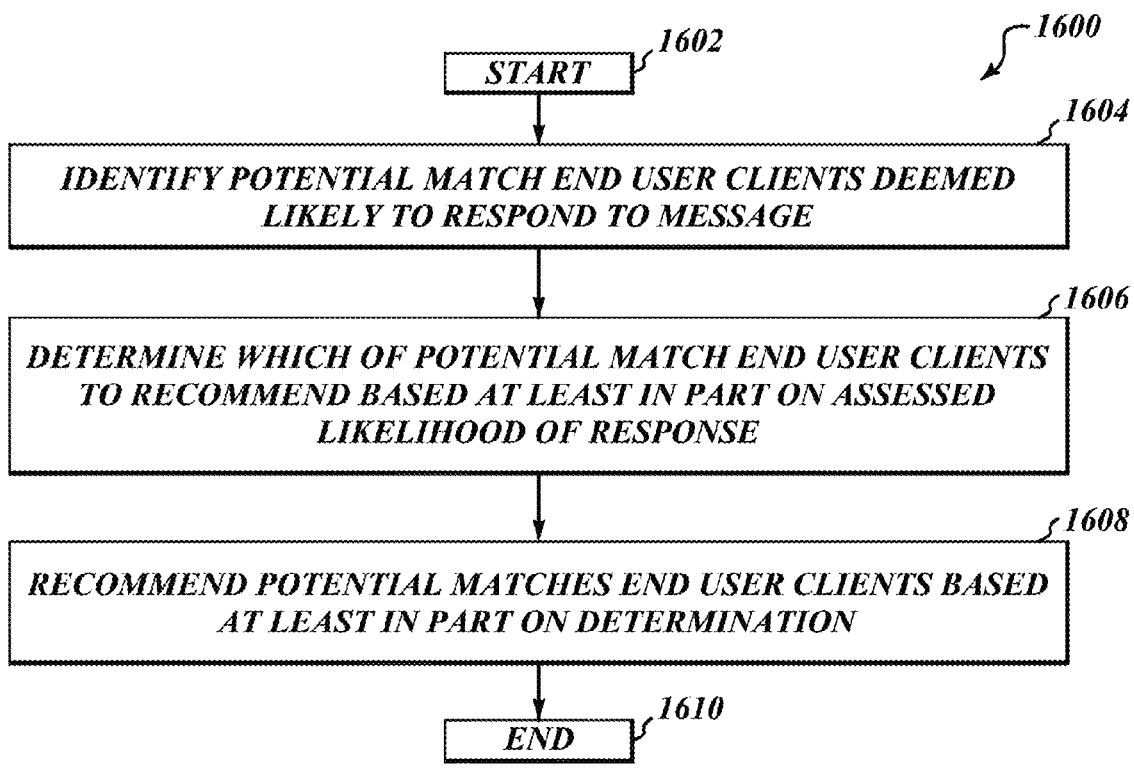
FIG. 16 is a flow diagram showing a low level method of operation of a matching service system to assess a likelihood of a user entity responding to a message and recommend matches based on the assessed likelihood, according to one illustrated embodiment.

FIG. 16 shows a low level method 1600 of assessing a likelihood of a user entity responding to a message and recommending matches based on the assessed likelihood, according to one illustrated embodiment. The low level algorithm adjustment method 1600 may be employed as part of, or in addition to, the high level method 300 (FIG. 3).

The recipient end user client entity evaluation method 1600 starts at 1602. For example, the recipient end user client entity evaluation method 1600 may start on powering up of a component or device of the matching services system 106, for instance powering up the matching services server computer system 124 or in response to a call from the matching services method 300 (FIG. 3). Alternatively, the recipient end user client entity evaluation method 1600 may start on receipt of information or inquiries from end user client entities 104. Alternatively, the recipient end user client entity evaluation method 1600 may start in response to a launching of an application by an end user client entity, or in response to a call from a calling routine executing on an end user client processor-based system 120.

At 1604, the matching service server computer system 114 identifies one or more potential match end user clients deemed likely to respond to messages. The matching service server computer system 114 may employ any of a large number of criteria in order to assess likelihood of replying or responding to a message or contact attempt. For example, the matching service server computer system 114 may identify which of the end user clients identified for a potential or proposed match have not received any messages within a defined time of a current time within a defined time of a current time, or received less than a lower threshold number of messages within the defined time of the current time. Such end user client entities may be deemed as likely to respond to messages. Also for example, the matching service server computer system 114 may identify potential or proposed end user clients identified for the potential or proposed match who have logged on to the matching service either frequently (e.g., greater than a frequency threshold) and/or for periods of time exceeding a minimum duration threshold. Conversely, the matching service server computer system 114 may identify potential or proposed end user clients identified for the potential or proposed match who have logged on to the matching service either infrequently (e.g., less than a frequency threshold) and/or for periods of time below a minimum duration threshold. Such end user clients may be deemed as unlikely or less likely to respond to messages. As another example, the matching service server computer system 114 may identify end user clients identified for potential or proposed matches who employ a mobile end user device (e.g., smart phone, laptop computer) as likely to respond to messages. As yet another example, the matching service server computer system 114 may identify end user clients identified for a potential or proposed match who have received a number of messages within a defined time of a current time which exceeds an upper message threshold as unlikely to respond to messages. Conversely, the matching service server computer system 114 may identify end user clients identified for a potential or proposed match who have received a number of messages within a defined time of a current time which is below a lower message threshold as likely to respond to messages.

At 1606, the matching service server computer system 114 determines which of a number of potential match end user clients to recommend to the respective end user client based at least in part on an assessed likelihood of response. Such may be based on one or more factors deemed reflective of likelihood of replying or responding. Some factors may be weighted more than other factors.

At 1608, the matching service server computer system 114 recommends at least some of the potential matches end user clients to the based at least in part on the determination. The matching service server computer system 114 may electronically forward profile(s) and/or image(s) of end user clients identified as potential matches who are likely to reply or respond.

The algorithm adjustment method 1600 terminates at 1610 until called again. Alternatively, the algorithm adjustment method 1600 may repeat, for example, with control returning to 1602 or 1604. Alternatively, the algorithm adjustment method 1600 may run concurrently with other methods or processes, for example, as one of multiple threads on a multi-threaded processor system.

Figure 17:
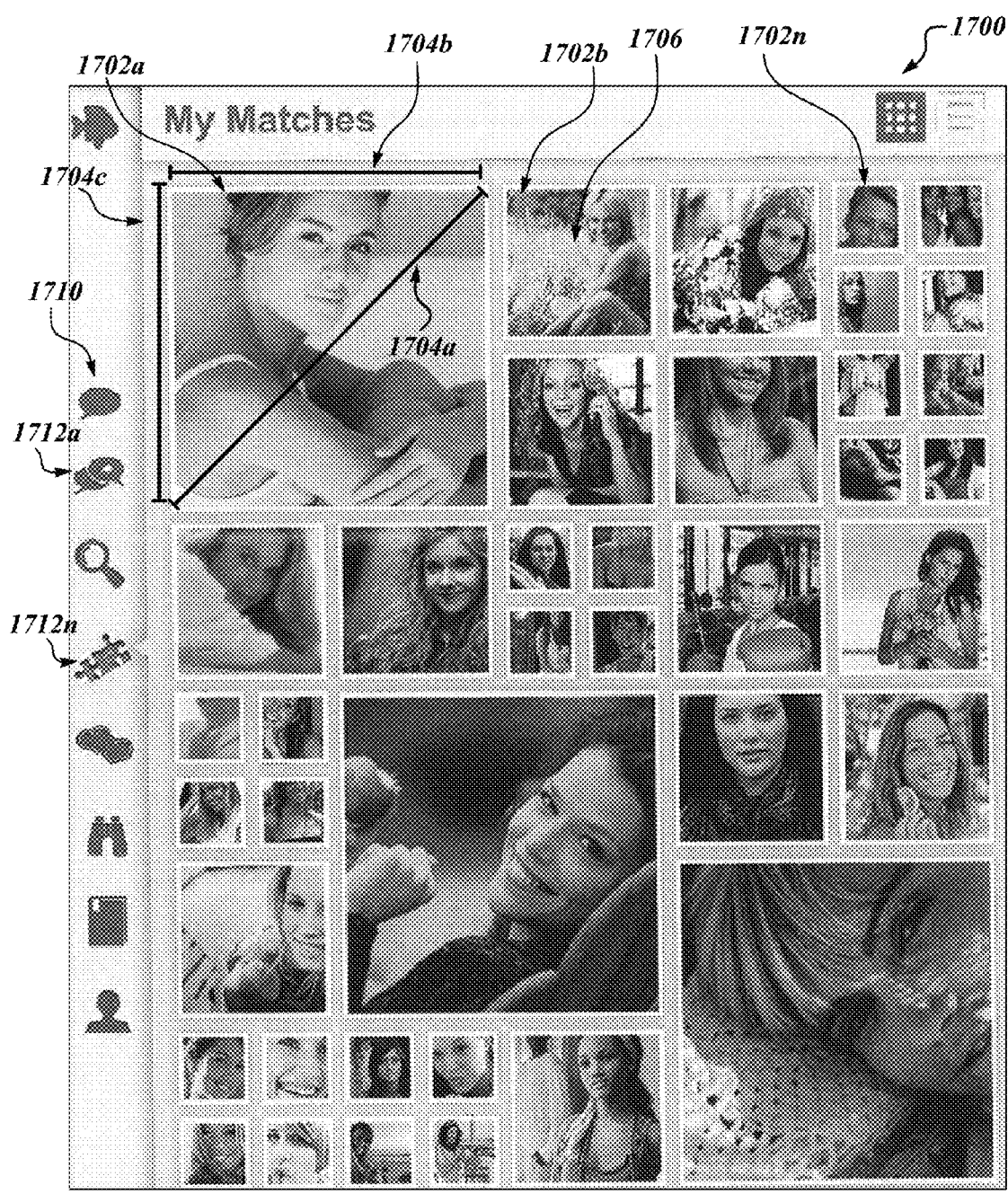
FIG. 17 is a screen print a set of graphical objects displayed in a window, screen or a page, the graphical objects which represent a set of potential candidates, a suitability or assessment of the candidate reflected in a dimension of the respective graphical object for that represents the particular candidate, according to one illustrated embodiment.

FIG. 17 shows a window, screen or a page 1700 which includes a set of graphical objects 1702*a*, 1702*b*-1702*n* (three called out, collectively 1702) which each represent a respective candidate from a set of potential candidates generated for an end user, according to one illustrated embodiment.

As explained herein, each graphical object 1702 has at least one associated dimension 1704*a*, 1704*b*, 1704*c* (only called out for one graphical object 1702*a*, collectively 1704) which provides a visual indication of an assessment, suitability, relative rank or degree of match of that candidate with respect to other candidates for given search criteria.

The graphical objects 1702 may take a variety of forms. For example, the graphical objects 1702 may take the form of a frame, window, box, polygon or other closed shape. In the illustrated embodiment, the graphical objects 1702 take the form of rectangular frames, windows or boxes. Notably, the window, screen or page 1700 includes graphical objects of two or more dimensions or sizes. In the illustrated embodiment, three distinct dimensions or sizes are employed, large 1702*a*, medium 1702*b* and small 1702*n*. This allows presentation of candidates in three ranks or orders. The highest ranked or most suitable candidates are indicated by the large graphical objects 1702*a*. The next highest ranked or suitable candidates are indicated by the medium sized graphical objects 1702*b*. The next highest ranked or suitable candidates are indicated by the small sized graphical objects 1702*n*. Of course, fewer or greater number of variations in dimensions may be employed, although too many will likely be confusing to an end user. The varied dimensions or sizes (collectively 1704) may be a diagonal dimension 1704*a*, a width 1704*b*, a length 1704*c*, perimeter, circumference or any other spatial dimension.

Each graphical object 1702 includes or is spatially associated with identifying information which identifies the candidate. Some of the identifying information may be visible or displayed to an end user. For instance, each graphical object 1702 may include or show a photograph or picture 1706 (only one called out) of the candidate. Additionally or alternatively, each graphical object 1702 may include textual identification information, for instance a name, nickname or other identifier for an individual associated with the respective graphical object 1702. Additionally or alternatively, each graphical object 1702 may include textual descriptive information, for instance a biography, a quote, a list or excerpt of likes and/or dislikes, favorite music, bands, shows, foods, drinks, teams, activities for an individual associated with the respective graphical object 1702.

Each graphical object 1702 may be encoded as an image file or as another file type. This may facilitate population of various different windows, screens or pages 1700 for various end users where the same candidate is identified for two or more of those end users. The graphical objects are preferably easily scaleable. Such accommodates the possibility that an individual associated with a graphical object 1702 may appear highly ranked from one end user, but not as highly ranked for some other end user. The dimensions may be normalized. Thus, where an end user has many candidates ranked similarly to one another, the relative gradation between the ranks represented by the different categories of dimension may be small. Likewise, where an end user has many candidates ranked far apart from one another, the relative gradation between the ranks represented by the different categories of dimension may be large. Further, a mapping between the categories of dimension and the generate values or ranks may not be the same from end user to end user, or even between various instances for a given end user.

Each graphical object 1702 may be a distinct user selectable user interface object. Thus, selection on a touch sensitive display via touch or a stylus may prompt an action related to the individual associated with the respective graphical object 1702. Alternatively, selection on a non-touch sensitive display via a pointer device (e.g., mouse, trackball, joystick, eye or movement tracker system such as KINECT® system) may prompt an action related to the individual associated with the respective graphical object 1702. Selection may, for example, cause a message to be sent to the individual associated with the respective graphical object 1702.

The window, screen or a page 1700 may include a menu 1710, with various user selectable icons 1712*a*-1712*n* (only two called out, collectively 1712).

Figure 18:
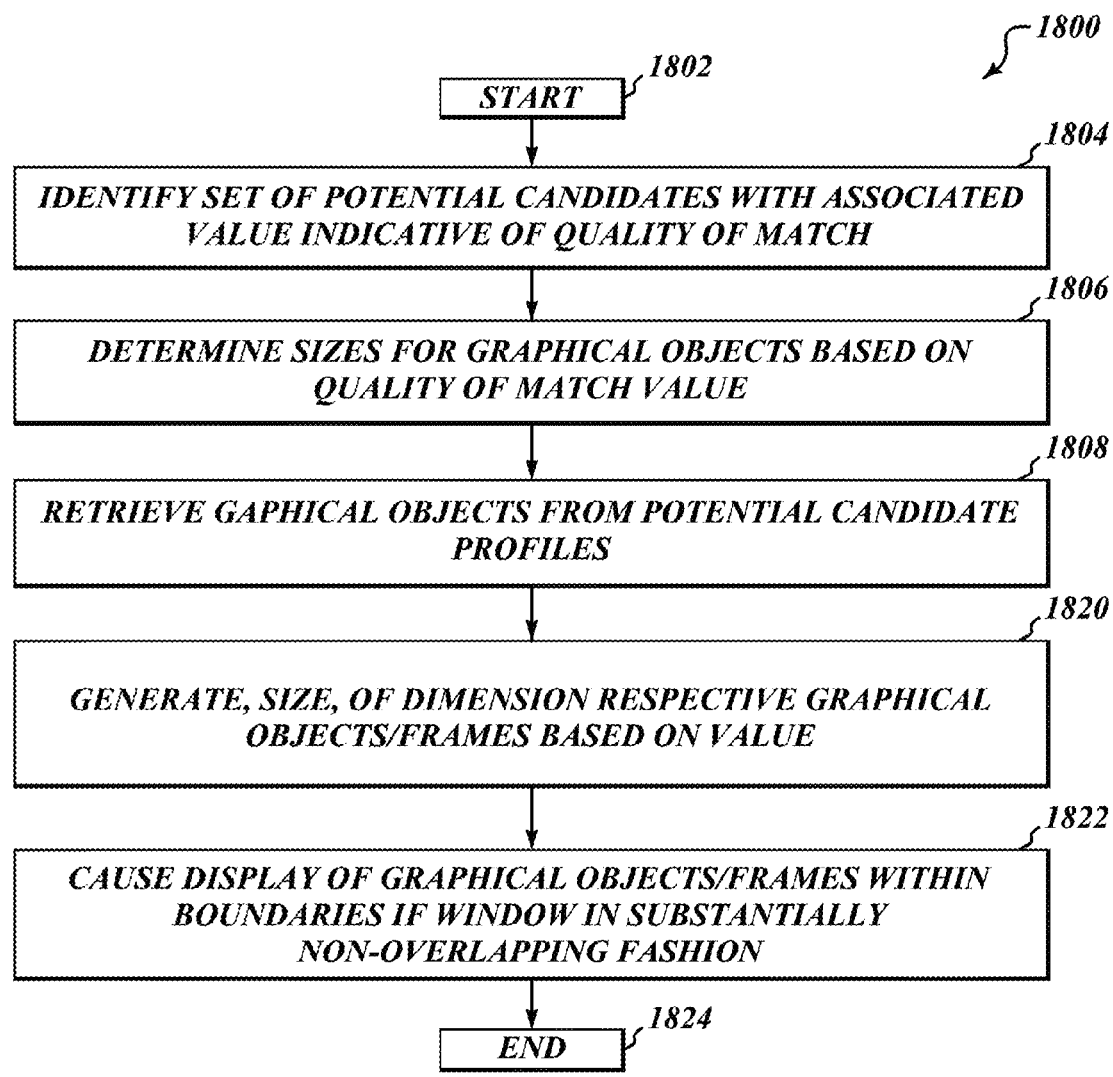
FIG. 18 is a flow diagram showing a high level method of operating a matching service system to graphically display the results of recommended matches, according to one illustrated embodiment.

FIG. 18 shows a high level method 1800 of operating of a matching service system to graphically display the results of recommended matches, according to one illustrated embodiment.

At 1802, the method begins when called by the end user client. Examples of the end user client calling the method includes initiating a search or opening a Webpage with an automatic search Web component.

At 1804, the matching service server computer 114 identifies other end user clients in the database as potential candidates, and a respective quality value indicative of a strength of the match or assessed suitability between the potential candidate and the end user client.

At 1806, the matching service server computer 114 determines sizes and/or dimensions for at least some of the graphical objects based at least in part on the quality value.

At 1808, the matching service server computer 114 retrieves graphical objects for some or all of the various potential candidates. Such may be stored in a database in a nonstransitory processor-readable medium.

At 1820, the matching service server computer 114 scales the various graphical objects based on the sizes or dimensions determined at 1806.

At 1822, the end user client's terminal displays the scaled graphical objects, within the boundaries of the window, screen or page, preferably in substantially non-overlapping fashion.

The graphical display method 1800 terminates at 1824 until called again. Alternatively, the graphical display method 1800 may repeat, for example with control returning to 1802 or 1804. Alternatively, the graphical display method may run concurrently with other methods or processes, for example, as one of multiple threads on a multi-threaded processor system.

Figure 19:
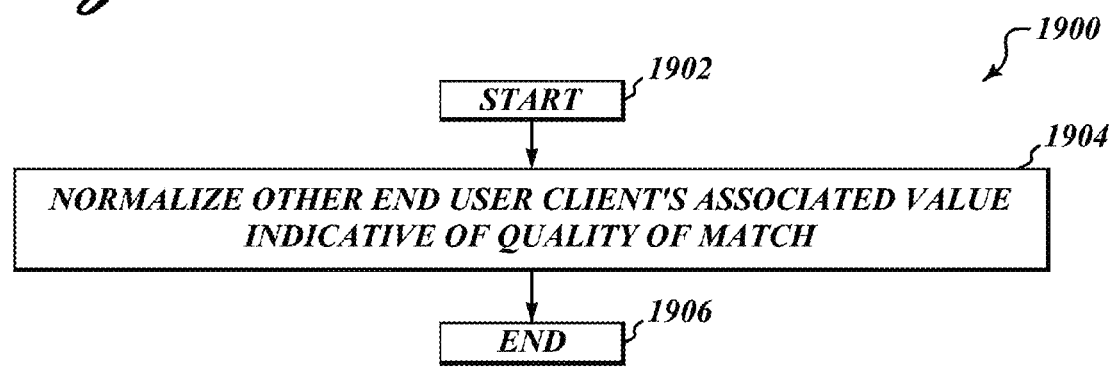
FIG. 19 is a flow diagram showing a low level method of normalizing values associated with the strength of other end user client matches, according to one illustrated embodiment.

FIG. 19 shows a low level method 1900 of normalizing values associated with the strength or assessment of suitability of the candidates, according to one illustrated embodiment. The low level normalizing method 1800 may be employed as part of, or in addition to, the high level method 300 (FIG. 3) or the high level method 1800 (FIG. 18).

At 1902, the method 1900 begins, for example when called by the end user client or a routine executing on the matching service server computer 114. Examples of the end user client calling the method include initiating a search or opening a Webpage with an automatic search Web component.

At 1904, the matching service server computer 114 normalizes the values associated with the potential candidates and then groups the values into at least two size categories The normalizing method 1900 terminates at 1906 until called again. Alternatively, the normalizing method 1900 may repeat, for example with control returning to 1902 or 1904. Alternatively, the normalizing method may run concurrently with other methods or processes, for example, as one of multiple threads on a multi-threaded processor system.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory.

The various embodiments described above can be combined to provide further embodiments. All of the commonly assigned US patent application publications, US patent applications, foreign patents, foreign patent applications and non-patent publications referred to in this specification and/or listed in the Application Data Sheet, including but not limited to U.S. Provisional Patent Application No. 61/857,617, filed Jul. 23, 2013; U.S. Provisional Patent Application No. 61/691,082, filed Aug. 20, 2012; and U.S. patent application Ser. No. 13/971,483, filed Aug. 20, 2013 are incorporated herein by reference, in their entirety. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operation in a matching service system of a matching service, the matching service system having at least one processor, at least one nontransitory processor-readable medium communicatively coupled to the at least one processor, and a number of communications ports communicatively coupled to the at least one processor which provide communications with a plurality of end user devices, the end user devices logically associable with a plurality of end user client accounts of the matching services, the end user client accounts logically associable with end user clients of the matching service, the method comprising:

for each of a number of respective end user clients, identifying a plurality of potential candidates, each of the potential candidates associated with a value indicative of a quality of a match between the respective potential candidate and the respective end user client;

for each of at least two of the potential candidates, determining a size for a respective graphical object based on the respective quality of match between the respective potential candidate and the respective end user client, wherein the graphical objects are windows and determining a size for a respective graphical object includes determining the size of the window based at least in part on an assessment of the quality of a match between the respective potential candidate and the respective end user client, and determining the size of the window based at least in part on an assessment of the quality of a match between the respective potential candidate and the respective end user client includes selecting a diagonal dimension of the respective window from at least three sizes, the diagonal dimension for higher quality matches larger than the diagonal dimension for lower quality matches; and causing a presentation to the respective end user client of at least two of the graphical objects at the determined size.

2. The method of claim 1 wherein determining a size for a respective graphical object based on the respective quality of a match between the respective potential candidate and the respective end user client includes determining the size to provide a visual indication of an assessed relative rank or relative degree of a match between the respective potential candidate and the respective end user client.

3. The method of claim 1 wherein the graphical objects are pictures of the respective potential candidates.

4. The method of claim 1, further comprising:
for at least some of the graphical objects, including a picture of the respective potential candidate for display to the respective end user.

5. The method of claim 1, further comprising:
for at least some of the graphical objects, including a textual description associated with the respective potential candidate for display to the respective end user.

6. The method of claim 1, further comprising:
normalizing the values associated with the potential candidates; and
grouping the normalized values into at least two size categories.

7. The method of claim 1 wherein causing a presentation to the respective end user client of at least two of the graphical objects at the determined size includes causing the concurrent presentation of at least three graphical objects, each corresponding to a respective one of at least three different potential candidates.

8. The method of claim 1 wherein causing a presentation to the respective end user client of at least two of the graphical objects at the determined size includes forwarding the graphical object to the end user device associated with the respective end user client, each graphical object including a hyperlink specific to the respective potential candidate.

9. The method of claim 1, further comprising:
determining which of the plurality of potential matching end user clients to recommend to the respective end user client based at least in part on an assessed likelihood of response.

10. A matching service system, comprising:
a number of communications ports which provide communications with a plurality of end user devices, the end user devices logically associable with a plurality of end user client accounts of the matching services, the end user client accounts logically associable with end user clients of the matching service;

at least one nontransitory processor-readable medium that stores at least one of processor executable instructions or data; and at least one processor communicatively coupled to the communications ports and at least one nontransitory processor-readable medium, and that:
for each of a number of respective end user clients, identifies a plurality of potential candidates, each of the potential candidates associated with a value indicative of a quality of a match between the respective potential candidate and the respective end user client;

for each of at least two of the potential candidates, determines a size for a respective graphical object based on the respective quality of potential match between the respective potential candidate and the respective end user client, wherein the graphical objects are windows and the at least one processor determines the size of the window based at least in part on an assessment of the quality of a match between the respective potential candidate and the respective end user client, and the at least one processor selects a diagonal dimension of the respective window from at least three sizes, the diagonal dimension for higher quality matches larger than the diagonal dimension for lower quality matches; and causes a presentation to the respective end user client of at least two of the graphical objects at the determined size.

11. The matching service system of claim 10 wherein the at least one processor determines the size to provide a visual indication of an assessed relative rank or relative degree of match between the respective potential candidate and the respective end user client.

12. The matching service system of claim 10 wherein the graphical objects are windows and the at least one processor determines the size of the window based at least in part on an assessment of the quality of match between the respective potential candidate and the respective end user client.

13. The matching service system of claim 10 wherein the graphical objects are pictures of the respective potential candidates.

14. The matching service system of claim 10 wherein the at least one processor further:
for at least some of the graphical objects, includes a picture of the respective potential candidate for display to the respective end user and a hyperlink that is specific to the respective potential candidate.

15. The matching service system of claim 10 wherein the at least one processor further:
for at least some of the graphical objects, includes a textual description associated with the respective potential candidate for display to the respective end user.

16. The matching service system of claim 10 wherein the at least one processor further:
normalizes the values associated with the potential candidates; and
groups the normalized values into at least two size categories.

17. The matching service system of claim 10 wherein the at least one processor causes the concurrent presentation of at least three graphical objects, each corresponding to a respective one of at least three different potential candidates.

18. The matching service system of claim 10 wherein the at least one processor forwards the graphical object to the end user device associated with the respective end user client, each graphical object including a hyperlink specific to the respective prospective candidate in order to cause causing the presentation to the respective end user client.

19. A method of causing presentation of a visually perceptible ranking of potential candidates, the method comprising:

identifying a set of potential candidates, each of the potential candidates having a respective associated value indicative of an assessed suitability as a potential candidate for a first end user client;

for each of a plurality of the potential clients, determining at least one dimension of a respective representative graphical object based at least in part on the associated value of the respective potential candidate;

causing a presentation of the graphical objects at the respective determined dimensions in at least one window; and for at least the first end user client,
identifying at least one recipient end user client who the first end user client has messaged;
identifying a number of comparative end user clients who have also messaged the at least one recipient end user client;
identifying at least one other recipient end user client who at least one of the comparative end user clients has also messaged; and
recommending the at least one other recipient end user client to the first end user client.

20. The method of claim 19 wherein identifying a number of comparative end user clients who have also messaged the at least one recipient end user client includes performing a single value decomposition.

21. The method of claim 19 wherein identifying at least one other recipient end user client who at least one of the comparative end user clients has also messaged includes identifying at least one other recipient end user client based at least in part on a total number of comparative end user clients who have messaged the same at least one other recipient end user client.

22. The method of claim 19 wherein identifying at least one other recipient end user client who at least one of the comparative end user clients has also messaged includes identifying at least one other recipient end user client based at least in part on an evaluation of a likelihood that the at least one other recipient end user client will reply.

* * * * *

UNITED STATES PATENT AND TRADEMARK OFFICE
CERTIFICATE OF CORRECTION

PATENT NO. : 9,672,289 B1  Page 1 of 1
APPLICATION NO. : 14/339328
DATED : June 6, 2017
INVENTOR(S) : Markus Frind et al.

It is certified that error appears in the above-identified patent and that said Letters Patent is hereby corrected as shown below:

<u>Column 52, Line 22 In Claim 10:</u>
"Based on the respective quality of potential match" should read, --based on the respective quality of match--.

Signed and Sealed this
Fifth Day of September, 2017

Joseph Matal
*Performing the Functions and Duties of the*
*Under Secretary of Commerce for Intellectual Property and*
*Director of the United States Patent and Trademark Office*